US012298720B2

(12) United States Patent
Nagahara et al.

(10) Patent No.: US 12,298,720 B2
(45) Date of Patent: May 13, 2025

(54) CASE AND TIMEPIECE

(71) Applicant: CASIO COMPUTER CO., LTD., Tokyo (JP)

(72) Inventors: Miho Nagahara, Ome (JP); Kazumasa Yokoo, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 259 days.

(21) Appl. No.: 17/870,116

(22) Filed: Jul. 21, 2022

(65) Prior Publication Data

US 2023/0032879 A1 Feb. 2, 2023

(30) Foreign Application Priority Data

Jul. 29, 2021 (JP) ................................ 2021-124594

(51) Int. Cl.
*G04B 37/00* (2006.01)

(52) U.S. Cl.
CPC ................................ *G04B 37/0008* (2013.01)

(58) Field of Classification Search
CPC ................ G04B 37/0008; G04B 19/28; G04B 45/0092; G04B 37/22
See application file for complete search history.

(56) References Cited

U.S. PATENT DOCUMENTS

| | | | | |
|---|---|---|---|---|
| 4,620,798 A * | 11/1986 | Scarinzi | G04B 37/057 968/301 |
| 7,708,457 B2 | 5/2010 | Girardin et al. | |
| 11,442,412 B2 * | 9/2022 | Yasuda | G04B 37/225 |
| 2008/0181061 A1 | 7/2008 | Girardin et al. | |
| 2022/0035315 A1 * | 2/2022 | Hata | G04B 37/05 |

FOREIGN PATENT DOCUMENTS

| | | |
|---|---|---|
| JP | 2008185589 A | 8/2008 |
| JP | 2016164574 A | 9/2016 |
| JP | 2020056707 A | 4/2020 |

OTHER PUBLICATIONS

Notice of Reasons for Refusal dated Jul. 12, 2023 received in Japanese Patent Application No. JP 2021-124594.
Notice of Reasons for Refusal dated Apr. 1, 2025 received in Japanese Patent Application No. 2024-068206.

* cited by examiner

*Primary Examiner* — Edwin A. Leon
(74) *Attorney, Agent, or Firm* — Scully, Scott, Murphy & Presser, P.C.

(57) ABSTRACT

A case including a case main body, a first exterior member which is arranged on an upper part of the case main body, and positioning members which are connected to the first exterior member, and positionally fix the first exterior member on the case main body, in which the first exterior member has connection portions provided in an undersurface thereof, and the positioning members have first positioning portions which are arranged in the connection portions, positionally fixed in the first exterior member, and positionally fixed on the case main body, and second positioning portions which are arranged and positionally fixed on the case main body.

24 Claims, 23 Drawing Sheets

CASE AND TIMEPIECE

CROSS-REFERENCE TO RELATED APPLICATION

This application is based upon and claims the benefit of priority from the prior Japanese Patent Application No. 2021-124594, filed Jul. 29, 2021, the entire contents of which are incorporated herein by reference.

BACKGROUND OF THE INVENTION

1. Field of the Invention

The present invention relates to a case that is used for an electronic device such as a timepiece, and a timepiece equipped with the case.

2. Description of the Related Art

For example, a wristwatch case is known which has a structure where a decorative exterior member has been directly attached to the upper surface of a case main body with a plurality of screws, as shown in Japanese Patent Application Laid-Open (Kokai) Publication No. 2008-185589. In this technique, the exterior member is made of soft or fragile material.

SUMMARY OF THE INVENTION

An embodiment is a case comprising: a case main body; a first exterior member which is arranged on an upper part of the case main body; and positioning members which are connected to the first exterior member, and positionally fix the first exterior member on the case main body, wherein the first exterior member has connection portions provided in an undersurface thereof, and wherein the positioning members have (i) first positioning portions which are arranged in the connection portions, positionally fixed in the first exterior member, and positionally fixed on the case main body, and (ii) second positioning portions which are arranged and positionally fixed on the case main body.

Another embodiment is a timepiece comprising the case described above.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

According to the present invention, impacts are buffered, and decorativeness and design are enhanced.

DETAILED DESCRIPTION OF THE PREFERRED EMBODIMENTS

An embodiment where the present invention has been applied in a wristwatch will hereinafter be descried with reference to FIG. 1 to FIG. 23B.

Figure 1:
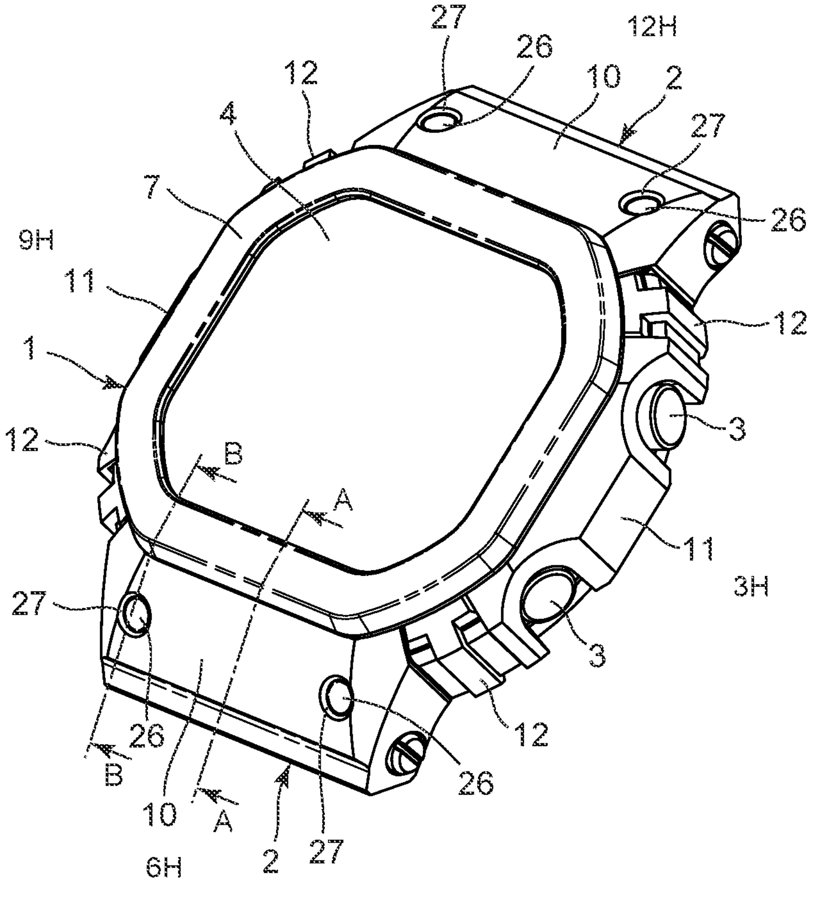
FIG. 1 is an enlarged perspective view of an embodiment where the present invention has been applied in a wrist-watch.
Figure 2:
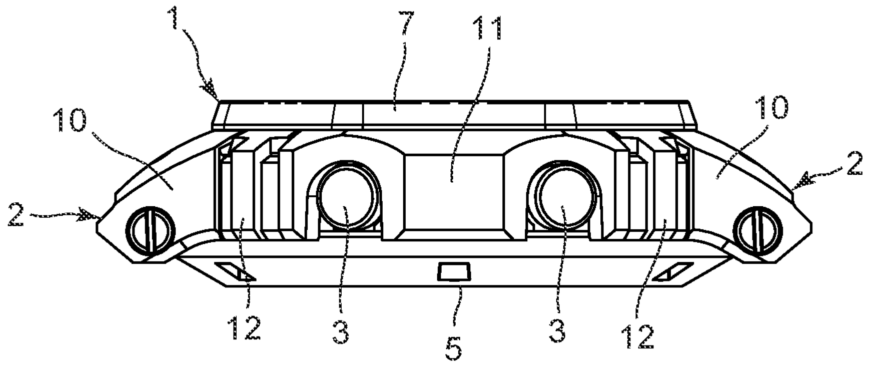
FIG. 2 is an enlarged side view showing the wristwatch of FIG. 1 when viewed from the three o'clock side.

This wristwatch has a wristwatch case 1, as shown in FIG. 1 and FIG. 2. On the twelve o'clock side and six o'clock side of the wristwatch case 1, band attachment sections 2 are provided to which watch bands (not shown in the drawings) are attached. Also, on the two o'clock side, four o'clock side, eight o'clock side, and ten o'clock side of the wristwatch case 1, switch buttons 3 are provided.

To the upper opening of the wristwatch case 1, a watch glass 4 is attached, as shown in FIG. 1. In addition, to the lower part of the wristwatch case 1, a back cover 5 is attached via a waterproof ring 5*a* (refer to FIG. 15), as shown in FIG. 2. Also, inside the wristwatch case 1, a timepiece module (not shown in the drawings) is provided. Although not shown in the drawings, the timepiece module has provided therein various components necessary for timepiece functions, such as a timepiece movement for driving pointers, a display section for displaying information regarding a time of day, a date, a day of the week, and the like, and a circuit section for driving these components.

Figure 3:
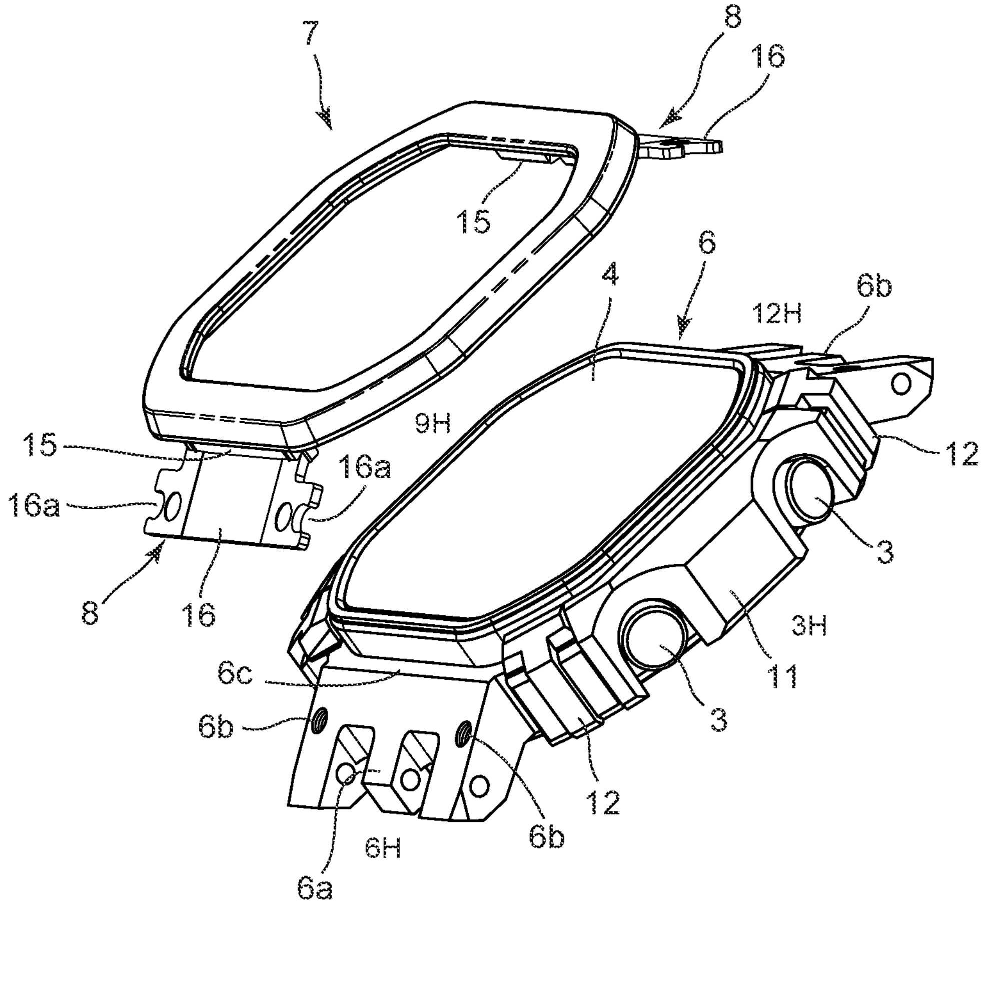
FIG. 3 is an exploded perspective view showing a state where an upper surface exterior member and positioning members are attached to a case main body of the wristwatch case shown in FIG. 1.
Figure 4:
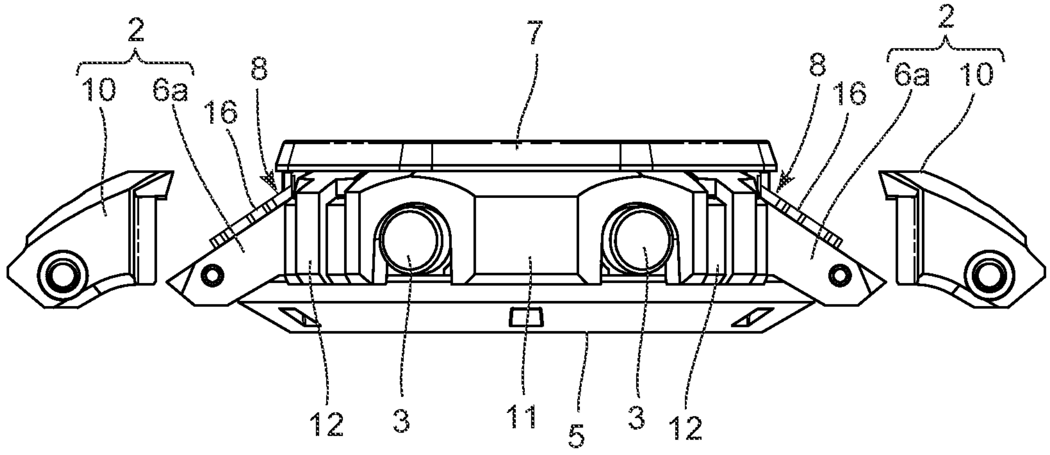
FIG. 4 is an exploded side view showing a state where band exterior members are attached to band attachment projection sections on the case main body of the wristwatch case shown in FIG. 2.

This wristwatch case 1 includes a case main body 6, as shown in FIG. 3 and FIG. 4. On the upper part of the case main body 6, an upper surface exterior member 7 which serves as a first exterior member is arranged with its position being fixed by positioning members 8. On the twelve o'clock side and six o'clock side of the case main body 6, band attachment projection sections 6*a* which server as attachment projections are provided, and band exterior members 10 which serve as second exterior members are arranged thereon. In the present embodiment, the band attachment sections 2 are constituted by the band attachment projection sections 6*a* and the band exterior members 10.

Also, on side surface portions of the case main body 6 on the three o'clock side and the nine o'clock side, side surface exterior members 11 which serve as third side surface members are arranged, as shown in FIG. 1 to FIG. 4. To the sides of each side surface exterior member 11 on the side surface of the case main body 6, decorative members 12 which serve as first and second side surface members are arranged. In the present embodiment, the case main body 6 is formed of metal or a hard synthetic resin. The above-described upper surface exterior member 7 should preferably be formed of a hard, expensive, and decorative metal such as a cobalt chrome alloy. However, the present invention is not limited thereto, and the upper surface exterior member 7 may be formed of a fragile material such as ceramics or jewelry.

The positioning members 8 are formed of a material softer than that of the upper surface exterior member 7, which is, for example, a highly rigid synthetic resin such as polyamide resin. The band exterior members 10, the side surface exterior members 11, and the decorative members 12 should preferably be formed of a hard and decorative material such as a titanium alloy. However, the present invention is not limited thereto and these members may be formed of a fragile material such as ceramics and jewelry. In the present embodiment, the upper surface exterior member 7, the band exterior members 10, the side surface exterior members 11, and the decorative members 12 are subjected to surface finishing treatment in order to enhance their decorativeness. This surface finishing treatment is surface finishing such as a hairline finish, a satin finish, a mirror finish, and the like.

Figure 5:
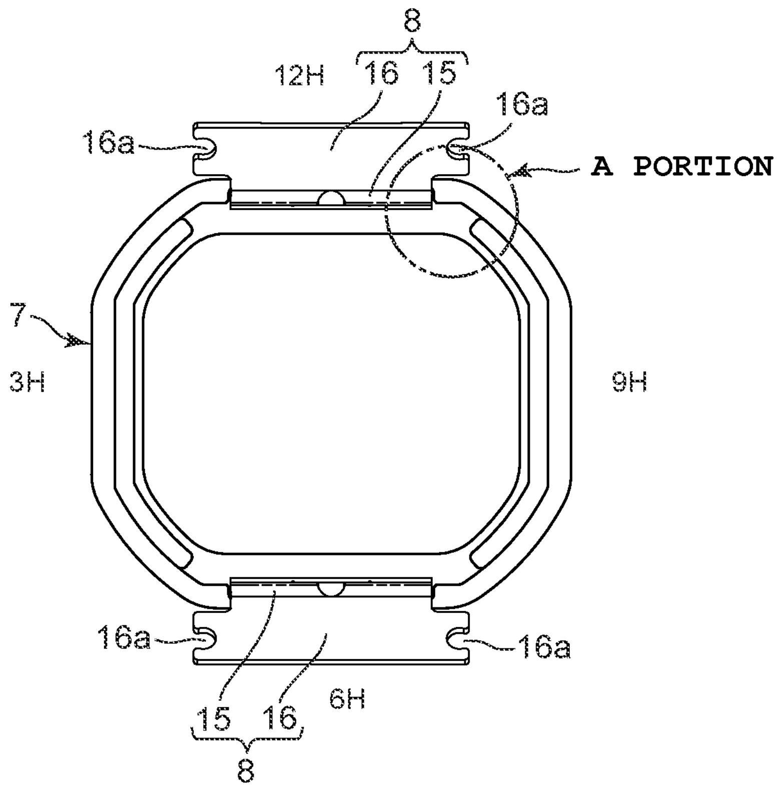
FIG. 5 is an enlarged back view showing the upper surface exterior member and positioning members of FIG. 3 when viewed from the back surface side.
Figure 6:
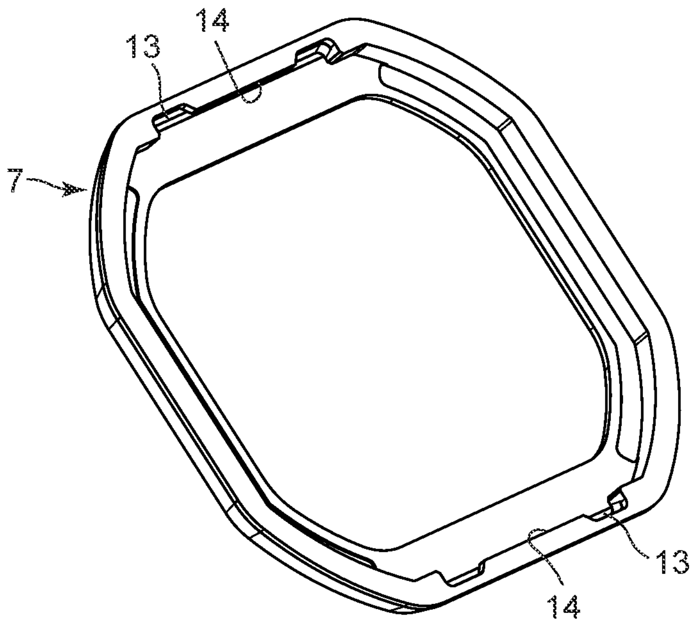
FIG. 6 is an enlarged perspective view showing the upper surface exterior member of FIG. 5 when viewed from the back surface side.

The upper surface exterior member 7, which is arranged on and covers the upper part of the case main body 6, has a substantially quadrangular frame shape which is the same as that of the upper part of the case main body 6, as shown in FIG. 3. In back surface portions of the upper surface exterior member 7 on the twelve o'clock side and the six o'clock side, connection recess sections 13 which serve as connection portions are formed to be open toward the back side (top side in FIG. 6), as shown in FIG. 5 and FIG. 6. That is, the connection recess sections 13 are formed in the upper surface exterior member 7 such that they cannot be seen from above. On inner portions of these connection recess sections 13, engaging hooks 14 are formed to be located on the twelve o'clock side and six o'clock side of the upper surface exterior member 7 while opposing each other. More specifically, each engaging hook 14 is formed in an eave shape and does not include side portions of the corresponding connection recess section 13 on the three o'clock side and the nine o'clock side.

Figure 7A:
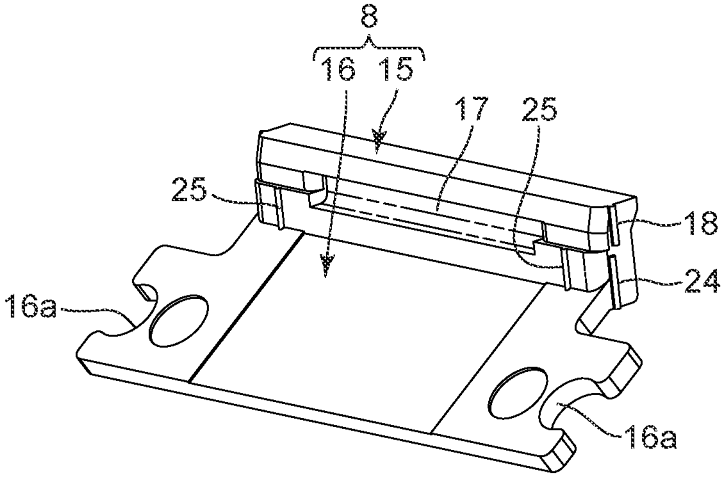
FIG. 7A is an enlarged perspective view of one of the positioning members shown in FIG. 3.
Figure 7B:
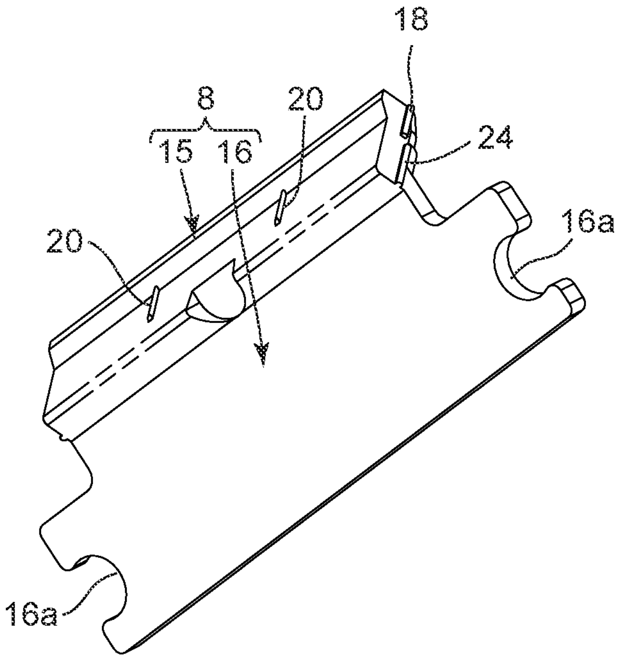
FIG. 7B is an enlarged perspective view of this positioning member when viewed from the back surface side.

The positioning members, which are used to fix the position of the upper surface exterior member 7 on the upper part of the case main body 6, are structured to be inserted from below into the connection recess sections 13 of the upper surface exterior member 7 and engage therewith, as shown in FIG. 5, FIG. 7A, and FIG. 7B. More specifically, each positioning member 8 includes an upright section 15 which is arranged in the corresponding connection recess section 13 of the upper surface exterior member 7 and serves as a first positioning portion, and a flat plate section 16 which is arranged on the corresponding band attachment projection section 6*a* of the case main body 6 and serves as a second positioning portion.

Figure 8:
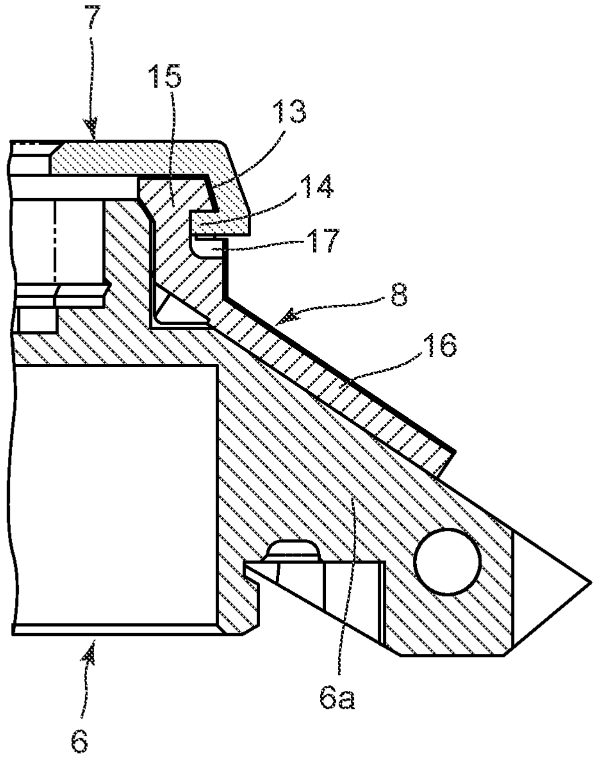
FIG. 8 is an enlarged sectional view showing a main portion of the wristwatch case taken along the A-A arrow view in FIG. 1, in which the corresponding band exterior member has been detached.

The upright section 15 is structured not to be seen from the outside by being arranged in the corresponding connection recess section 13 of the upper surface exterior member 7, as shown in FIG. 3 and FIG. 5. This upright section 15 includes an engaging recess section 17 which restricts the position of the upper surface exterior member 7 in vertical directions that are front and back directions by the engaging hook 14 in the corresponding connection recess section 13 of the upper surface exterior member 7 engaging with this engaging recess section 17, as shown in FIG. 7A, FIG. 7B and FIG. 8.

Figure 9:
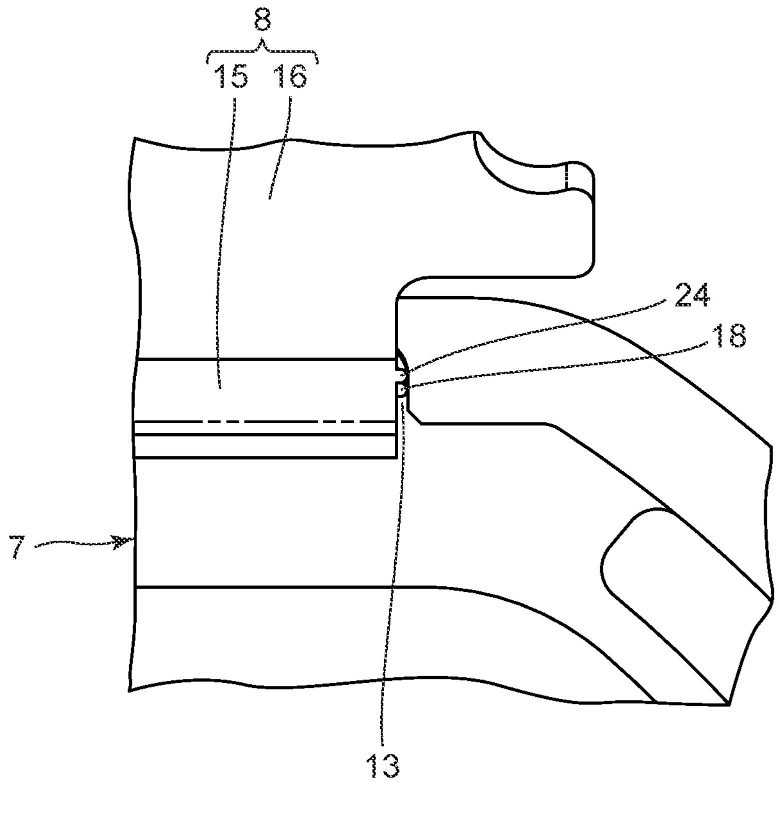
FIG. 9 is an enlarged view of an A portion which includes part of the upper surface exterior member and part of one of the positioning members shown in FIG. 5.

Also, this upright section 15 includes first dowels 18 which serve as first restriction projections and restrict the position of the upper surface exterior member 7 in the three o'clock and nine o'clock directions, as shown in FIG. 7A, FIG. 7B and FIG. 9. These first dowels 18 are provided on side surfaces of the upright section 15 in the three o'clock and nine o'clock directions, and restrict the position of the upper surface exterior member 7 in the three o'clock and nine o'clock directions by coming in contact with inner surface portions of the corresponding connection recess section 13 on the three o'clock side and the nine o'clock side.

Moreover, this upright section 15 includes second dowels 20 which serve as second restriction projections and restrict the position of the upper surface exterior member 7 in the twelve o'clock or six o'clock direction, as shown in FIG. 5 and FIG. 7B. The second dowels 20 are plurally provided on the inner surface of the upright section 15, that is, the surface which opposes the outer circumferential surface of the case main body 6. These second dowels 20 are structured to restrict the position of the upper surface exterior member 7 in the twelve o'clock or six o'clock direction by coming in contact with the outer circumferential surface of the case main body 6 when the upright section 15 is arranged in the corresponding connection recess section 13 and is in a state shown in FIG. 8 in which it is on an outer circumferential portion of the case main body 6 located above the corresponding band attachment projection section 6*a* of the case main body 6.

That is, the upright section 15 is structured to restrict the position of the upper surface exterior member 7 with respect to the case main body 6 in three-dimensional directions including the vertical directions, the three o'clock and nine o'clock directions, and the twelve o'clock and six o'clock directions by the first dowels 18 coming in contact with the inner surface portions of the connection recess section 13 on the three o'clock side and the nine o'clock side and the second dowels 20 coming in contact with the outer circumferential surface of the case main body 6 when the upright section 15 is inserted from below into the corresponding connection recess section 13 of the upper surface exterior member 7 and the engaging hook 14 in the connection recess section 13 engages with the engaging recess section 17, as shown in FIG. 5 to FIG. 9.

On the other hand, the band exterior members 10 are arranged on and cover the band attachment projection sections 6*a* of the case main body 6, as shown in FIG. 10, FIG. 11A, FIG. 11B and FIG. 13. Each of these band exterior members 10 includes a cover main body 21 which is arranged on the upper surface of the corresponding band attachment projection section 6*a* of the case main body 6, and a pair of cover sidewall sections 22 which is formed to the sides of the cover body 21 and arranged to the sides of the band attachment projection section 6*a* so as to serve as a second restriction recess.

Figure 10:
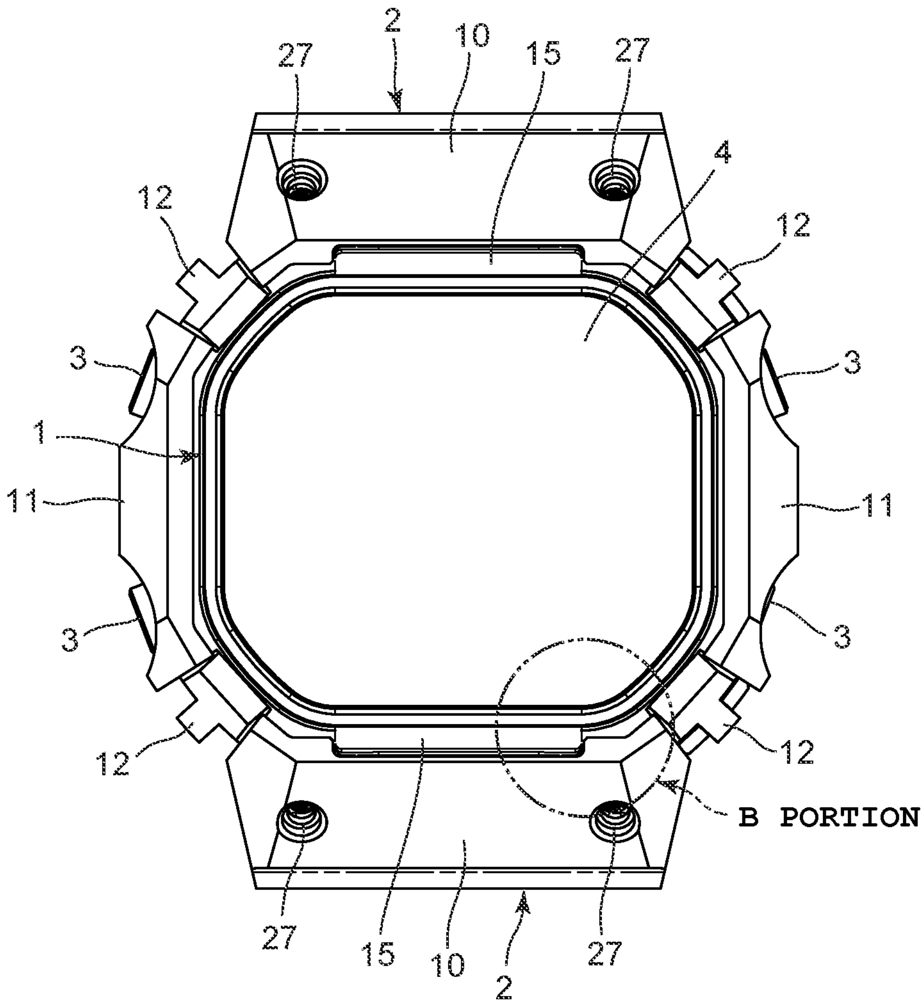
FIG. 10 is an enlarged planar view of the wristwatch case shown in FIG. 1, in which the upper surface exterior member has been detached.
Figure 15:
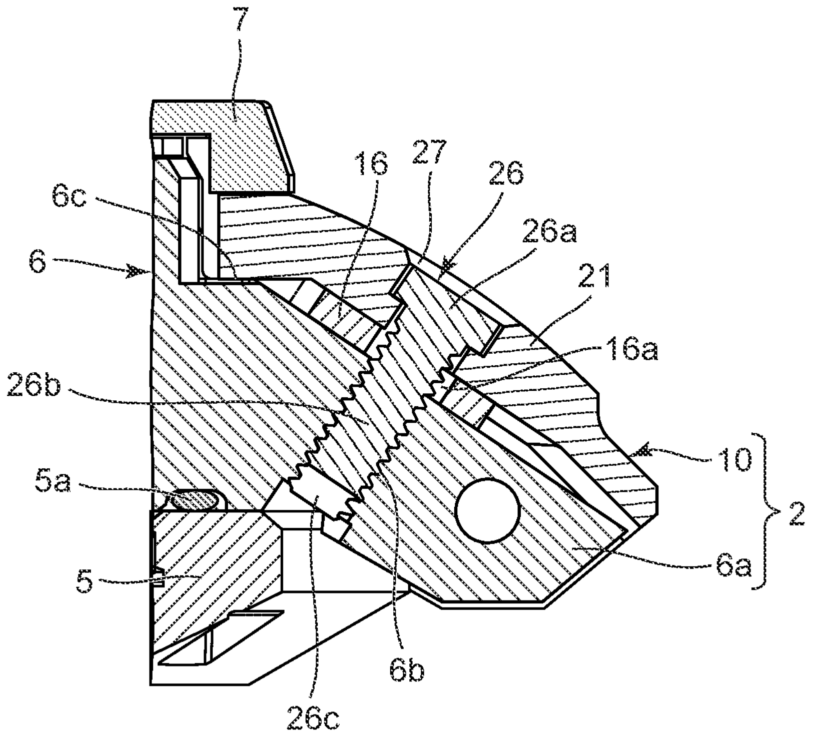
FIG. 15 is an enlarged sectional view showing a main portion of the wristwatch case taken along the B-B arrow view in FIG. 1.

The cover main body 21 is structured such that the flat plate section 16 of the corresponding positioning member 8 is held between the cover main body 21 and the corresponding band attachment projection section 6*a* when the cover main body 21 is arranged on the upper surface of the band attachment projection section 6*a*, as shown in FIG. 15. In an edge of this cover main body 21 on the case main body 6 side, a cutout section 23 is formed which serves as a first restriction recess and in which the upright section 15 of corresponding positioning member 8 is arranged, as shown in FIG. 10 to FIG. 12. That is, this cover main body 21 is structured to cover the upright section 15 by the upright section 15 being arranged in the cutout section 23, whereby the upright section 15 cannot be seen from the outside.

Also, each upright section 15 includes third dowels 24 which serve as third restriction projections and come in contact with the sides of the inner surface of the cutout section 23 of the corresponding band exterior member 10 on the three o'clock side and the nine o'clock side, and fourth dowels 25 which serve as fourth restriction projections and come in contact with inner surface portions of the cutout section 23 on the twelve o'clock side or the six o'clock side, as shown in FIG. 7A, FIG. 7B, and FIG. 10 to FIG. 12. The third dowels 24 are provided on the side surfaces of the upright section 15 in the three o'clock and nine o'clock directions, and the fourth dowels 25 are plurally provided on outer surface portions of the upright section 15 on the side opposite to the case main body 6 in the twelve o'clock or six o'clock direction.

As a result, each band exterior member 10 is structured such that the third dowels 24 of the upright section 15 of the corresponding positioning member 8 come in contact with the sides of the inner surface of the cutout section 23 in the cover main body 21 in the three o'clock and nine o'clock directions, whereby the position of the positioning member 8 in the three o'clock and nine o'clock directions is restricted, as shown in FIG. 7A, FIG. 7B, and FIG. 10 to FIG. 12. In addition, each band exterior member 10 is structured such that the fourth dowels 25 of the upright section 15 of the corresponding positioning member 8 come in contact with the inner surface portions of the cutout section 23 in the cover main body 21 on the twelve o'clock side or the six o'clock side, whereby the position of the positioning member 8 in the twelve o'clock and six o'clock directions is restricted.

Also, the pair of cover sidewall sections 22 of each band exterior member 10 is to restrict the position of the band exterior member 10 in the three o'clock and nine o'clock directions, as shown in FIG. 10 to FIG. 13. More specifically, the pair of cover sidewall sections 22 is structured such that, when the cover main body 21 is arranged on the corresponding band attachment projection section 6*a* of the case main body 6 with the flat plate section 16 of the corresponding positioning member 8 being held therebetween, these cover sidewall sections 22 are arranged to the sides of the band attachment projection section 6*a* and restrict the position of the band exterior member 10 with respect to the band attachment projection section 6*a* in the three o'clock and nine o'clock directions.

As a result, the present embodiment is structured such that, when each cover main body 21 is arranged on the corresponding band attachment projection section 6*a* with the flat plate section 16 of the corresponding positioning member 8 being held therebetween, and each pair of cover sidewall sections 22 is arranged to the sides of the corresponding band attachment projection section 6*a* so as to restrict the position of each band exterior member 10 in the three o'clock and nine o'clock directions, the second dowels 20 of the upright section 15 of each positioning member 8 come in contact with the outer circumferential surface of the case main body 6, and thereby restrict the position of each positioning member 8 with respect to the corresponding band attachment projection section 6*a*, as shown in FIG. 10 to FIG. 13 and FIG. 15.

Figure 14:
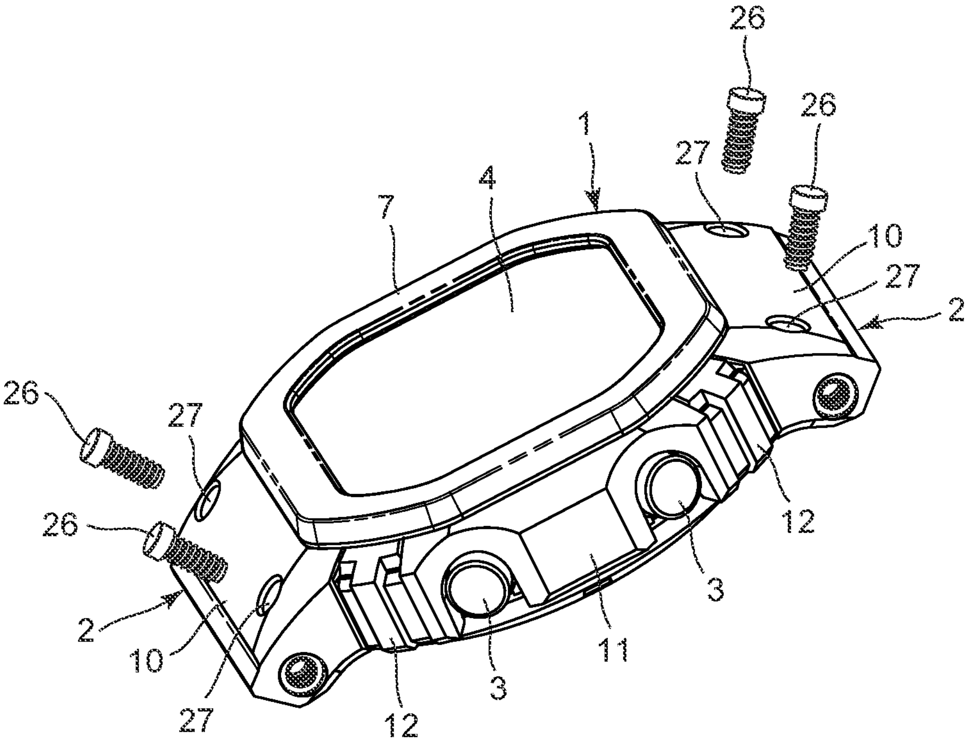
FIG. 14 is an enlarged perspective view showing a state where the band exterior members are attached to the band attachment projection sections on the case main body of the wristwatch case of FIG. 1 by screw members.
Figure 16:
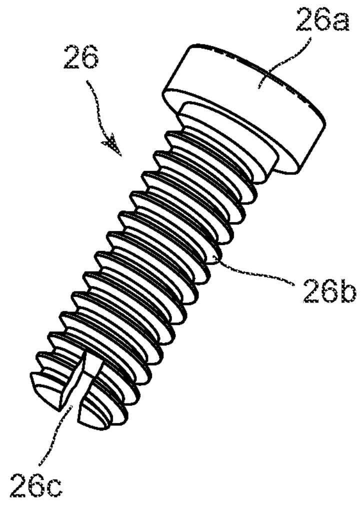
FIG. 16 is an enlarged perspective view of one of the screw members shown in FIG. 14.

Also, each band exterior member 10 is structured to be attached and fixed to the corresponding band attachment projection section 6*a* of the case main body 6 by a plurality of screw members 26 with the flat plate section 16 of the corresponding positioning member 8 being held between the band exterior member 10 and the band attachment projection section 6*a*, as shown in FIG. 14 and FIG. 15. Each of these screw members 26 includes a decorative head section 26*a* which is arranged in the corresponding band exterior member 10, a thread section 26*b* which is screwed into the corresponding band attachment projection section 6*a* through a screw insertion section 16*a* formed in the corresponding flat plate section 16, and a screwdriver groove 26*c* formed in the leading end of the thread section 26*b*, as shown in FIG. 15 and FIG. 16.

Figure 11A:
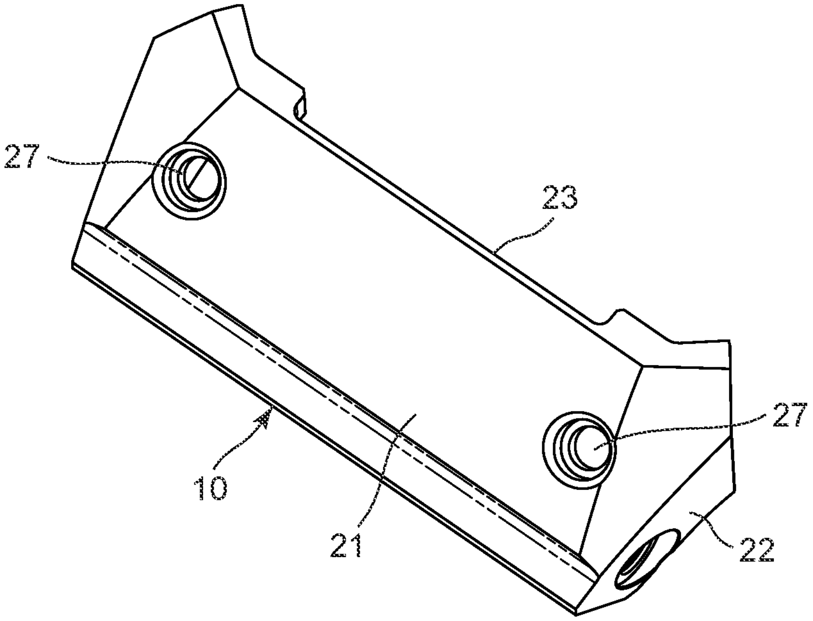
FIG. 11A is an enlarged perspective view of one of the band exterior members shown in FIG. 4.
Figure 11B:
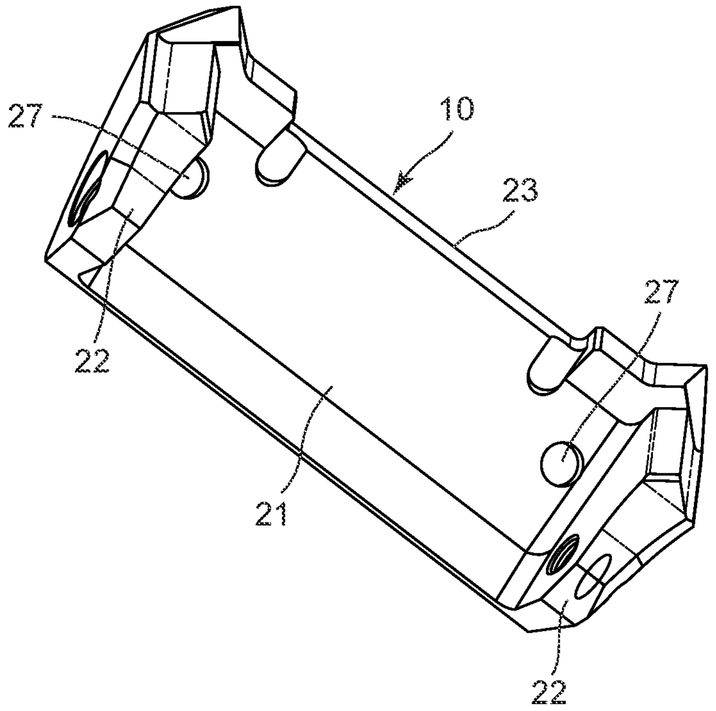
FIG. 11B is an enlarged perspective view of this band exterior member when viewed from the back surface side.
Figure 12:
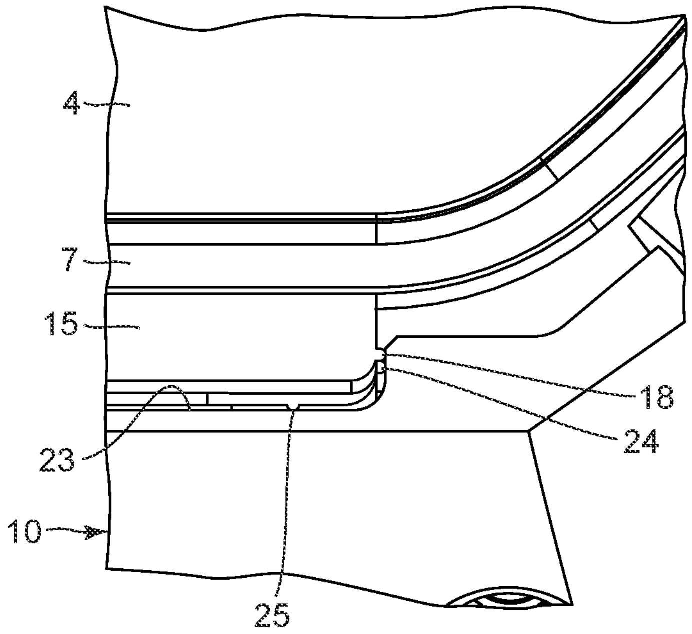
FIG. 12 is an enlarged view showing a B portion of the wristwatch case shown in FIG. 10.
Figure 13:
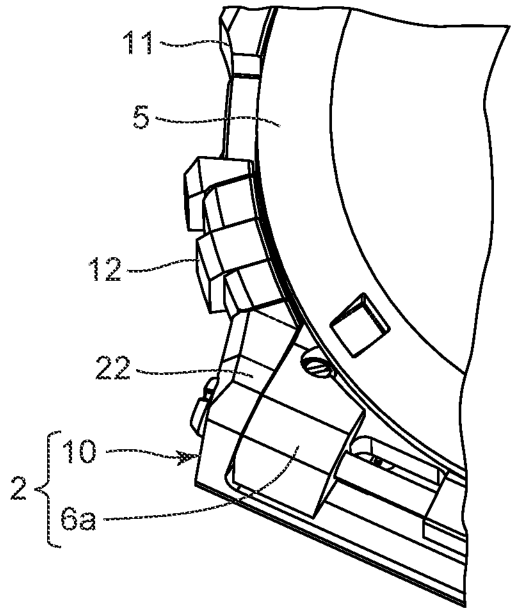
FIG. 13 is an enlarged back view showing a main portion of one of the band attachment sections on the wristwatch case of FIG. 1 when viewed from the back surface side.

In two areas on the three o'clock side and nine o'clock side of each band exterior member 10, counterbored holes 27 are formed in which the decorative head sections 26*a* of the corresponding screw members 26 are arranged, as shown in FIG. 11A, FIG. 11B and FIG. 15. These counterbored holes 27 are each provided with a large-diameter hole portion in which the corresponding decorative head section

26*a* is arranged, and a small-diameter hole portion into which the corresponding thread section 26*b* is inserted. The screw insertion sections 16*a* in the flat plate sections 16 of the positioning members 8 are semicircular cutout sections into which the thread sections 26*b* are inserted. These screw insertion sections 16*a* are formed in side portions of each flat plate section 16 in the three o'clock and nine o'clock directions while coaxially corresponding to the counterbored holes 27, as shown in FIG. 7A and FIG. 7B.

Figure 17:
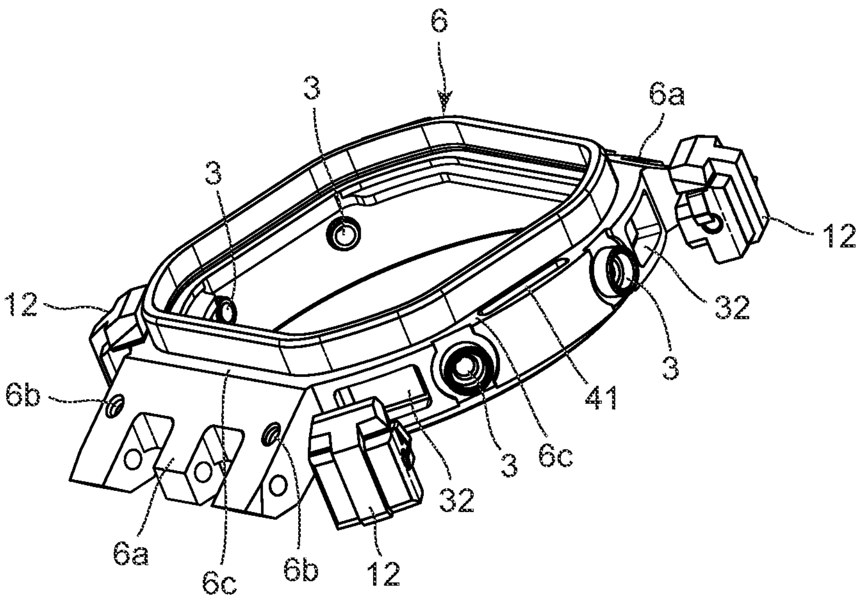
FIG. 17 is an enlarged perspective view showing the case main body of the wristwatch case in FIG. 3.

Also, each band attachment projection section 6*a* has screw holes 6*b* into which the corresponding thread sections 26*b* are screwed, as shown in FIG. 3, FIG. 15 and FIG. 17. These screw holes 6*b* are formed in side portions of each band attachment projection section 6*a* in the three o'clock and nine o'clock directions while coaxially corresponding to the counterbored holes 27 of the corresponding band exterior member 10 and the screw insertion sections 16*a* of the corresponding flat plate section 16. In addition, these screw holes 6*b* vertically penetrate through the corresponding band attachment projection section 6*a*.

The screw members 26 are structured such that, after their thread sections 26*b* are inserted from above the band exterior members 10 into the screw insertion sections 16*a* of the flat plate sections 16 of the positioning members 8 through the counterbored holes 27 of the band exterior members 10 and reach the screw holes 6*b* of the band attachment projection sections 6*a*, the leading end of a screwdriver (not shown in the drawings) is inserted into each screw hole 6*b* of the band attachment projection sections 6*a* from the back surface sides of the band attachment projection sections 6*a* so as to be inserted into each screwdriver groove 26*c* formed in the leading ends of the thread sections 26*b*, whereby each thread section 26*b* can be rotated by the screwdriver, as shown in FIG. 14 and FIG. 15.

That is, each screw member 26 is structured such that, when the screwdriver is rotated with the leading end of the screwdriver being inserted into the corresponding screw hole 6*b* of the corresponding band attachment projection section 6*a* from the back surface side of the band attachment projection section 6*a* and arranged in the screwdriver groove 26*c* in the thread section 26*b* of the screw member 26, the thread section 26*b* is rotated and screwed into the screw hole 6*b* of the band attachment projection section 6*a* so as to be tightened, as shown in FIG. 14 and FIG. 15.

In addition, each screw member 26 is structured such that, when its thread section 26*b* is screwed into the corresponding screw hole 6*b* of the corresponding band attachment projection section 6*a* so as to be tightened, its decorative head section 26*a* is arranged in the large-diameter hole portion of the corresponding counterbored hole 27 of the corresponding band exterior member 10 and presses the cover main body 21 of the band exterior member 10 against the flat plate section 16 of the corresponding positioning member 8, whereby the flat plate section 16 is pressed against the band attachment projection section 6*a* by the cover main body 21, as shown in FIG. 15.

Also, each band exterior member 10 is structured such that, when it is attached to the corresponding band attachment projection section 6*a* by the corresponding screw members 26 with its position in the three o'clock and nine o'clock directions being restricted by its pair of cover sidewall sections 22 being in contact with the sides of the band attachment projection section 6*a*, the flat plate section 16 of the corresponding positioning member 8 is pressed against and fixed on the band attachment projection section 6*a*, as shown in FIG. 15.

In addition, the band exterior members 10 are structured such that, when the flat plate sections 16 of the positioning members 8 are pressed against the band attachment projection sections 6*a* by the band exterior members 10 and fixed thereon, the inner surface portions of the cutout sections 23 in the cover main bodies 21 on the twelve o'clock side and the six o'clock side are pressed against the fourth dowels 25 of the upright sections 15 of the positioning members 8, whereby the positions of the positioning members 8 with respect to the band attachment projection sections 6*a* in the twelve o'clock and six o'clock directions are restricted, and the positioning members 8 are positionally fixed on the band attachment projection sections 6*a*, as shown in FIG. 12 and FIG. 15.

As a result, each band exterior member 10 is structured such that the sides of the inner surface of the cutout section 23 in the cover main body 21 in the three o'clock and nine o'clock directions are pressed against the third dowels 24 provided on the sides of the upright section 15 of the corresponding positioning member 8 in the three o'clock and nine o'clock directions, whereby the position of the positioning member 8 in the three o'clock and nine o'clock directions is restricted, the positioning member 8 is positionally fixed on the corresponding band attachment projection section 6*a*, and the upper surface exterior member 7 is positionally fixed on the upper part of the case main body 6 by the fixed positioning member 8, as shown in FIG. 12.

Each of the above-described decorative members 12 provided on the side surface portions of the case main body 6 on the three o'clock side and the nine o'clock side includes a fixing member 30 which is fixed to the side surface of the case main body 6, and a movable member 31 which is attached to the fixing member 30 in a manner to be vertically movable by use of an attachment shaft 28, as shown in FIG. 17 to FIG. 21C.

The fixing member 30 includes a fitting projection section 33 which is fitted into one of a plurality of fitting recess sections 32 provided in the side surface of the case main body 6, and a pair of first decorative sections 34 which is provided on side portions of the fitting projection section 33 in a manner to be arranged on the side surface of the case main body 6, as shown in FIG. 17 to FIG. 21C. The fitting recess sections 32 of the case main body 6, each of which has a substantially rectangular recess shape that is long in a horizontal direction, are formed in four portions of the case main body 6 on the one o'clock side, the five o'clock side, the seven o'clock side, and the eleven o'clock side.

The fitting projection section 33, which is inserted into the corresponding fitting recess section 32, has a substantially rectangular shape which is substantially equal to that of the fitting recess section 32 and whose size is also substantially equal to that of the fitting recess section 32, and the corners of which have been chamfered, as shown in FIG. 17 to FIG. 21C. This fitting projection section 33 is structured to be fitted into the fitting recess section 32 by its undersurface coming in contact with the bottom surface of the fitting recess section 32 and its side surface on the corresponding band attachment projection section 6*a* side of the case main body 6 coming in contact with the corresponding side of the inner surface of the fitting recess section 32 so as to positionally fix and arrange the fitting projection section 33.

Figure 18A:
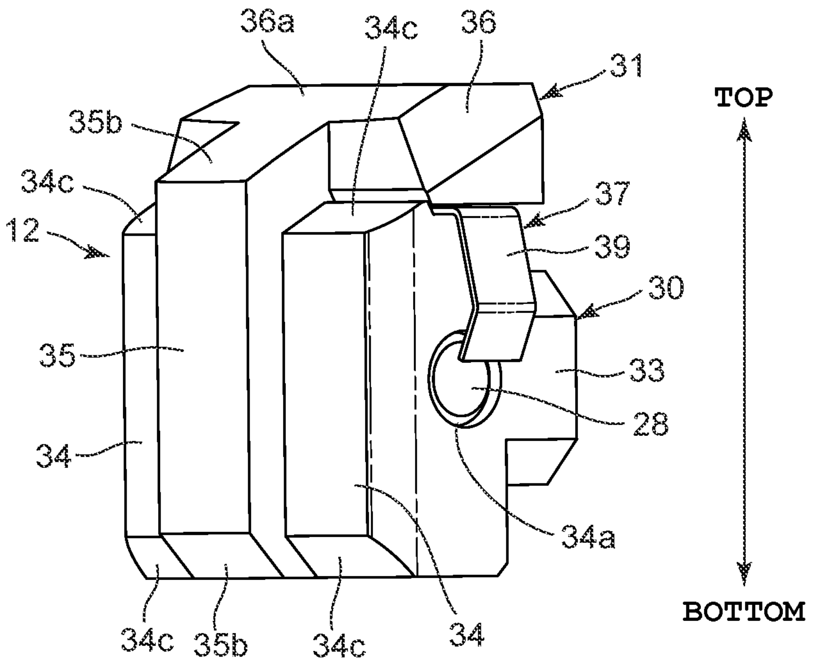
FIG. 18A is an enlarged perspective view showing the outer side of a decorative member on the wristwatch case of FIG. 3.
Figure 18B:
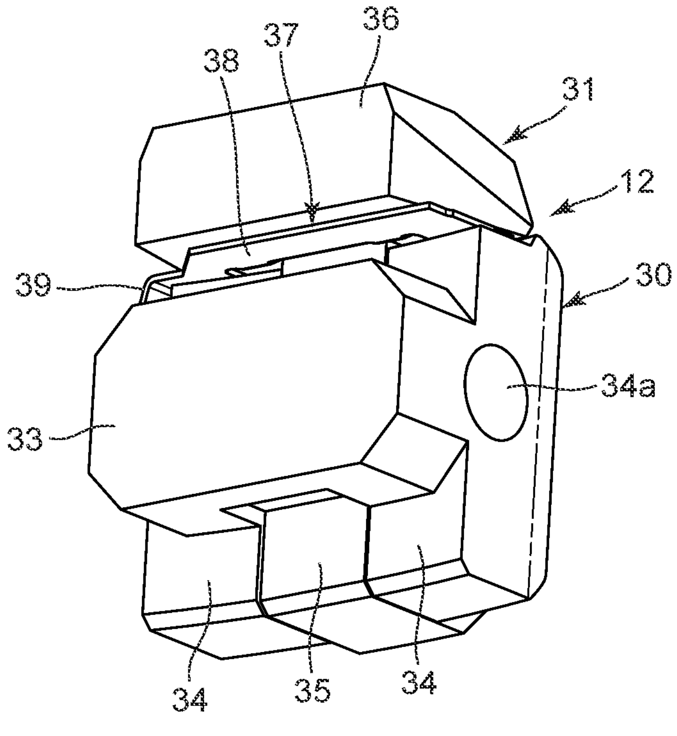
FIG. 18B is an enlarged perspective view showing the inner side of this decorative member on the wristwatch case.

The fixing member 30 is structured such that the inner surface of the fitting projection section 33 on the case main body 6 side is adhered to the inner surface of the corresponding fitting recess section 32 with adhesive tape (not shown) with the fitting projection section 33 being positionally fixed in the fitting recess section 32, whereby the fixing member 30 is temporarily fixed, as shown in FIG. 17, FIG. 18A and FIG. 18B. In addition, the fixing member 30 is structured such that an edge of one of the first decorative sections 34 located further from the corresponding band attachment projection section 6*a* than the other one is fixed to the side surface of the case main body 6 by welding, such as laser welding, with the fixing member 30 being temporarily fixed with adhesive tape.

Each of the pair of first decorative sections 34 is formed in a rectangular column shape whose vertical length is longer than that of the fitting projection section 33, and the upper and lower parts of each first decorative section 34 project upward and downward with respect to the fitting projection section 33, as shown in FIG. 17 to FIG. 21C. In this pair of first decorative sections 34, first attachment holes 34*a* into which the attachment shaft 28 is inserted are formed coaxially corresponding to each other. Also, on substantially half of the upper end surface of each first decorative section 34 on the case main body 6 side, a step recess section 34*b* is formed to be one step lower than the other half.

The movable member 31 includes a second decorative section 35 which is arranged between the pair of first decorative sections 34, and a third decorative section 36 which is arranged on the upper parts of the pair of first decorative sections 34, as shown in FIG. 17 to FIG. 21C. The second decorative section 35 has a rectangular column shape whose vertical length is longer than that of each first decorative section 34, and is structured such that its lower part is at the same height as the pair of first decorative sections 34 and its upper part projects above the pair of first decorative sections 34. In this second decorative section 35, a second attachment hole 35*a* into which the attachment shaft 28 is inserted is formed coaxially corresponding to the first attachment holes 34*a* of the first decorative sections 34.

Also, the second decorative section 35 is formed such that its projection length toward the outside from the case main body 6 is longer than those of the pair of first decorative sections 34, as shown in FIG. 18A, FIG. 18B, FIG. 19 and FIG. 21A to FIG. 21C. That is, the second decorative section 35 is formed such that, when arranged between the pair of first decorative sections 34, this second decorative section 35 protrudes toward the outside of the case main body 6 from the area between the pair of first decorative sections 34. Also, the upper part of the second decorative section 35 is formed such that its portion opposing the outer circumferential surface of the case main body 6, that is, its portion corresponding to the step recess sections 34*b* of the pair of first decorative sections 34 is cut out.

The third decorative section 36 is formed on this cutout portion of the upper part of second decorative section 35 so as to be arranged on the step recess sections 34*b* in the upper ends of the pair of first decorative sections 34 and thereby arranged on both the step recess sections 34*b* and the outer circumferential surface, that is, the side surface of the case main body 6, as shown in FIG. 18A to FIG. 21C. That is, this third decorative section 36 is formed such that its projection length in the direction toward the outside from the case main body 6 is substantially equal to the sum of the projection length of the step recess section 34*b* of each first decorative section 34 in the direction toward the outside from the case main body 6 and the projection length of the fitting projection section 33 in the direction toward the outside from the case main body 6.

Figure 20A:
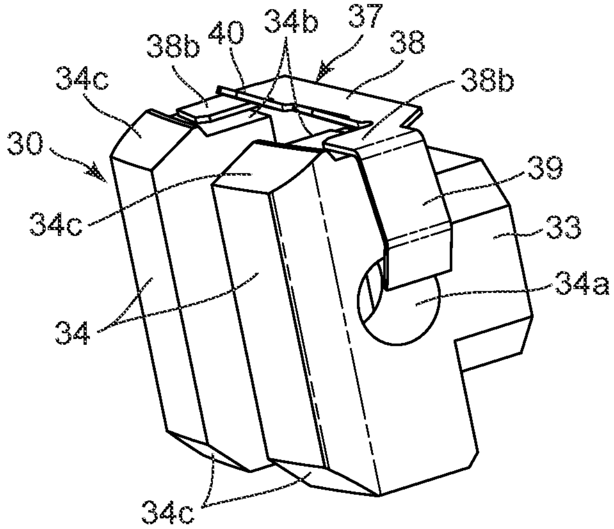
FIG. 20A is an enlarged perspective view showing the decorative member of FIG. 19 in a state where a spring member has been arranged on the upper part of a pair of first decorative sections of a fixing member.
Figure 20B:
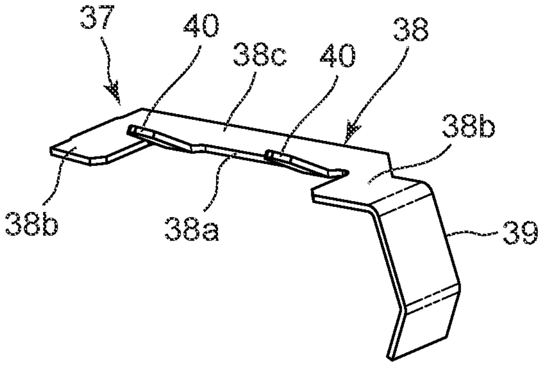
FIG. 20B is an enlarged perspective view of the spring member shown in FIG. 20A.
Figure 21C:
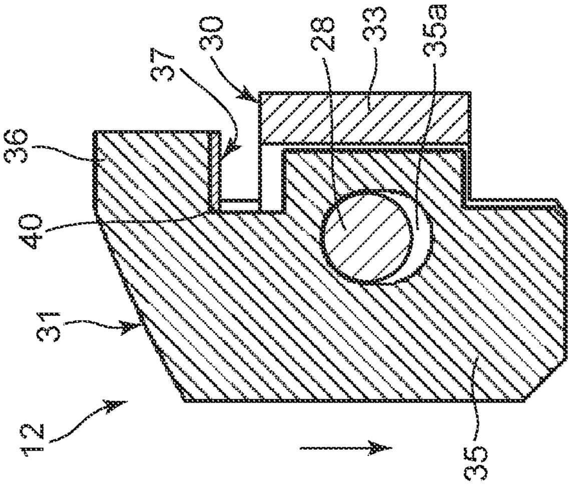
FIG. 21C is an enlarged sectional view of the decorative member in a state where the movable member has been pressed downward against the spring force of the spring member
Figure 21B:
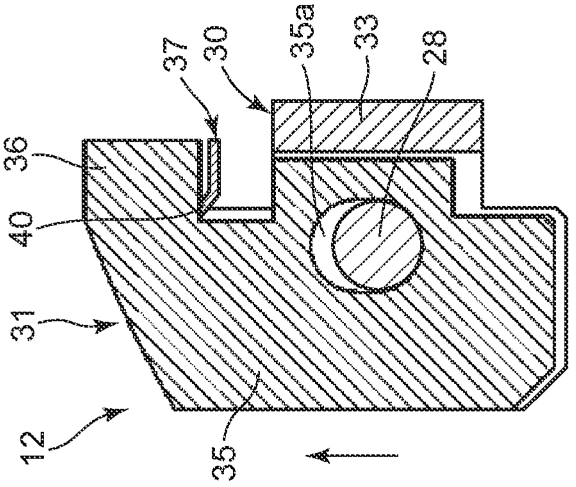
FIG. 21B is an enlarged sectional view of the decorative member taken along the C-C arrow view in FIG. 21A in a state where a movable member has been pressed upward by the spring force of the spring member.
Figure 21A:
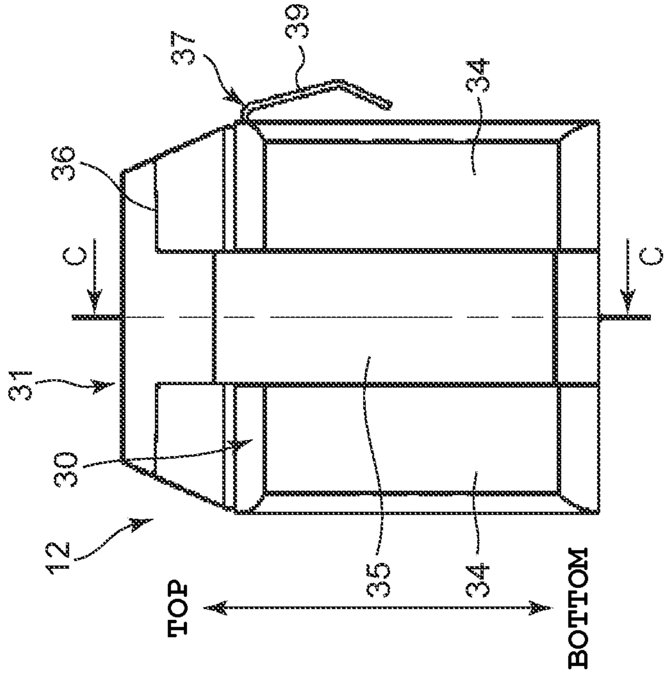
FIG. 21A is an enlarged front view of the decorative member shown in FIG. 18A and FIG. 18B.

Here, on and along the outer circumferential surface of the case main body 6, a first stepped surface 6*c* is formed at a position between the portion to which the watch glass 4 is attached and the portions corresponding to the band attachment projection sections 6*a*, as shown in FIG. 17. Accordingly, the third decorative section 36 is structured such that, when the fitting projection section 33 of the fixing member 30 is fitted into the corresponding fitting recess section 32 in the side surface of the case main body 6, the undersurface of the third decorative section 36 is arranged on the first stepped surface 6*c* formed on the outer circumferential surface of the case main body 6, as shown in FIG. 20 and FIG. 21B.

Also, the third decorative section 36 is structured such that its length in a direction along the outer circumferential surface, that is, the side surface of the case main body 6 is equal to the length of the pair of first decorative sections 34 in their array direction along the outer circumferential surface of the case main body 6, or in other words, the length of the fitting projection section 33 along the outer circumferential surface of the case main body 6, as shown in FIG. 18A to FIG. 21C.

Figure 19:
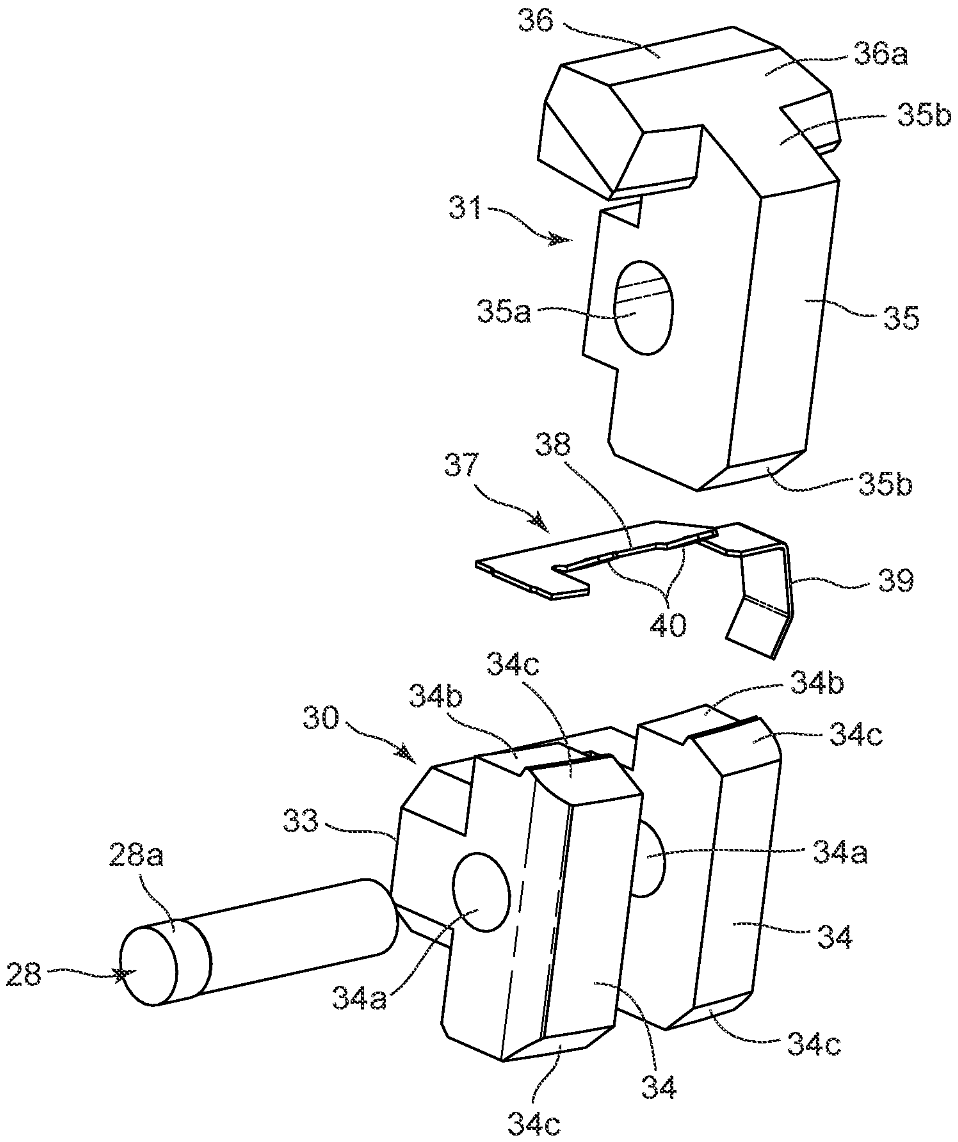
FIG. 19 is an exploded perspective view of the decorative member shown in FIG. 18.

That is, the third decorative section 36 is structured such that, when arranged on the step recess sections 34*b* in the upper ends of the pair of first decorative sections 34, this third decorative section 36 is positioned at a predetermined interval with respect to the upper surface of the fitting projection section 33, the inner surface of the third decorative section 36 on the case main body 6 side approaches the outer circumferential surface of the case main body 6, and the undersurface of the third decorative section 36 is arranged on the first stepped surface 6*c* of the case main body 6, as shown in FIG. 18A, FIG. 18B and FIG. 19.

Also, on the upper and lower parts of each of the pair of first decorative sections 34 excluding the portion corresponding to the step recess section 34*b* in the upper end, decorative inclined surfaces 34*c* are formed such that the area of the outer end surface of each first decorative section 34 on the side opposite to the case main body 6 is narrowed, as shown in FIG. 18A to FIG. 21C. Similarly, on the upper and lower parts of the second decorative section 35, decorative inclined surfaces 35*b* inclined at the same angle as those of the inclined surfaces 34*c* of each first decorative section 34 are formed. In addition, on the upper part of the third decorative section 36, a decorative inclined surface 35*b* which is continuous with the inclined surface 35*b* of the second decorative section 35 on the upper side is formed.

Also, the attachment shaft 28 which attaches the movable member 31 of the decorative member 12 to the fixing member 30 is structured to be inserted into the first attachment hole 34*a* of one of the first decorative sections 34 from the first attachment hole 34*a* of the other one of the first decorative sections 34 through the second attachment hole 35*a* in the second decorative section 35 with the second decorative section 35 of the movable member 31 being arranged between the pair of first decorative sections 34 of the fixing member 30, and thereby attach the movable member 31 to the fixing member 30, as shown in FIG. 18A to FIG. 21C.

More specifically, the attachment shaft 28 is formed such that its outer diameter is equal to the inner diameter of the first attachment hole 34*a* of each first decorative section 34 and its one end has formed thereon a press fitting section 28*a* whose outer diameter is slightly larger than the inner diameter of the first attachment hole 34*a*, as shown in FIG. 19. As a result, the attachment shaft 28 is structured such that, when its one end on the side opposite to the press fitting section 28*a* is inserted into the first attachment hole 34*a* of one of the first decorative sections 34 from the first attachment hole 34*a* of the other one of the first decorative sections 34 through the second attachment hole 35*a* of the second decorative section 35, the press fitting section 28*a* on the one end whose outer diameter is larger is fitted into and fixed in the first attachment hole 34*a* of the other one of the first decorative sections 34.

The second attachment hole 35*a* of the second decorative section 35 is an elongated hole whose vertical length is slightly longer than that of the first attachment hole 34*a* of each first decorative section 34, as shown in FIG. 19 and FIG. 21A to FIG. 21C. As a result, the movable member 31 is structured such that, when the second decorative section 35 is arranged between the first decorative sections 34 of the fixing member 30 and the attachment shaft 28 is inserted into the second attachment hole 35*a*, this attachment shaft 28 relatively moves in vertical directions in the second attachment hole 35*a* of the second decorative section 35, whereby the second decorative section 35 moves in the vertical directions together with the third decorative section 36.

Each decorative member 12 includes a spring member 37 which is an energizing member, as shown in FIG. 18A to FIG. 21C. This spring member 37 includes a spring main body 38 having a plate shape, a first spring section 39 which serves as a first energizing member and is arranged on a side surface of one of the corresponding first decorative sections 34, and second spring sections 40 which serve as second energizing members and force the corresponding third decorative section 36 upward.

The spring main body 38 is an elongated plate having a substantially rectangular shape, and formed such that its length in the direction along the outer circumferential surface, that is, the side surface of the case main body 6 is equal to the length of the corresponding pair of first decorative sections 34 in their array direction, that is, the length of the fitting projection section 33 in the direction along the outer circumferential surface of the case main body 6, as shown in FIG. 19 to FIG. 21C. Also, this spring main body 38 is formed such that its projection length in the direction toward the outside from the case main body 6 is substantially equal to the projection length of the corresponding third decorative section 36 in the direction toward the outside from the case main body 6.

In the spring main body 38, a spring cutout section 38*a* is formed, as shown in FIG. 19 to FIG. 21C. This spring cutout section 38*a* is formed such that its length in the array direction of the corresponding pair of first decorative sections 34 is longer than the length between these first decorative sections 34, and its projection length in the direction toward the outside from the case main body 6 is longer than the length of each step recess section 34*b* in the upper ends of the first decorative sections 34.

Also, the spring main body 38 includes a pair of holding sections 38*b* formed to the sides of the spring cutout section 38*a*, a connecting support section 38*c* which is arranged projecting toward the case main body 6 from the corresponding pair of first decorative sections 34, and connects the pair of holding sections 38*b*, as shown in FIG. 19 to FIG. 21C. As a result, this spring main body 38 is structured such that the pair of holding sections 38*b* is arranged on the step recess sections 34*b* in the upper ends of the corresponding pair of first decorative sections 34 and pressed and held by the corresponding third decorative section 36, and the connecting support section 38*c* projects toward the case main body 6 from the pair of first decorative sections 34 in this state while being arranged on the undersurface of the third decorative section 36.

On the other hand, the first spring section 39 is a plate spring section which is provided extending downward from one end of the spring main body 38 along the side surface of one of the corresponding first decorative sections 34 which is located further from the corresponding band attachment projection section 6*a* than the other one, as shown in FIG. 17 to FIG. 21C. The lower part of this first spring section 39 is bent in a chevron shape. More specifically, the first spring section 39 is structured to force a side surface of the corresponding side surface exterior member 11 arranged to a side of one of the corresponding first decorative sections 34, in a direction away from this first decorative section 34.

Also, the second spring sections 40 are two plate spring sections and formed on the spring cutout section 38*a* of the spring main body 38, as shown in FIG. 17 to FIG. 21C. These second spring sections 40 are arranged between the corresponding pair of first decorative sections 34 and the corresponding third decorative section 36, and force the third decorative section 36 upward. That is, the movable member 31 is structured such that the attachment shaft 28 relatively moves in the vertical directions in the second attachment hole 35*a* of the second decorative section 35, and the third decorative section 36 is pushed upward by the spring force of the second spring sections 40 together with the second decorative section 35.

Figure 22:
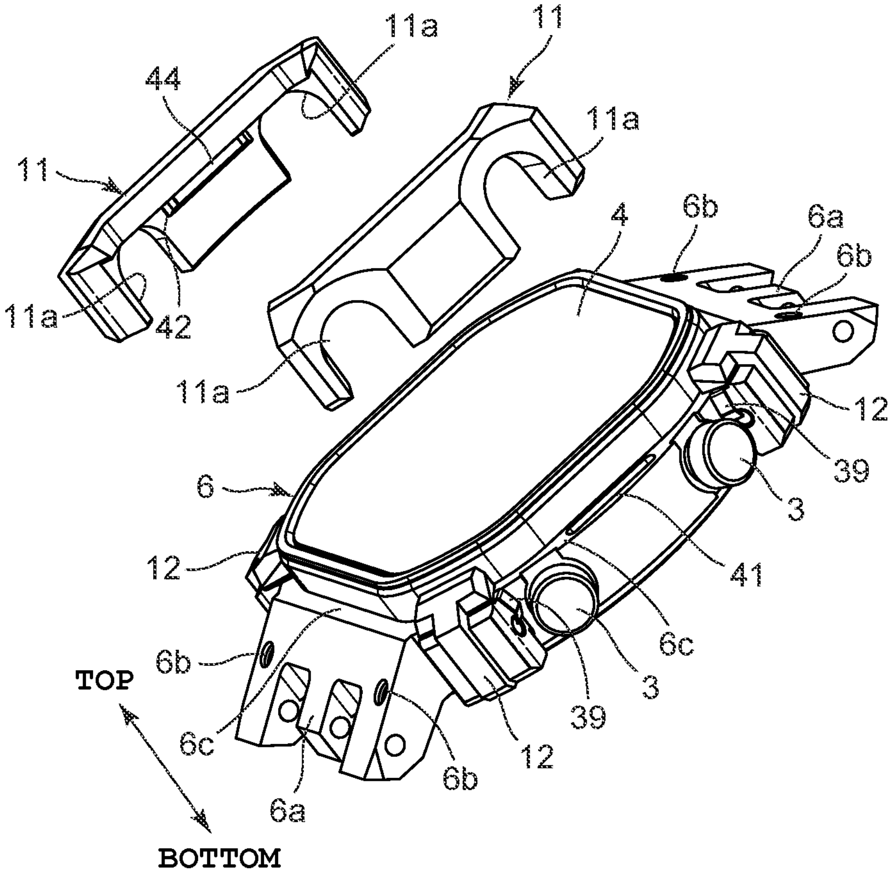
FIG. 22 is an exploded perspective view showing a state where side surface exterior members are attached to the side surface of the case main body shown in FIG. 17.
Figure 23A:
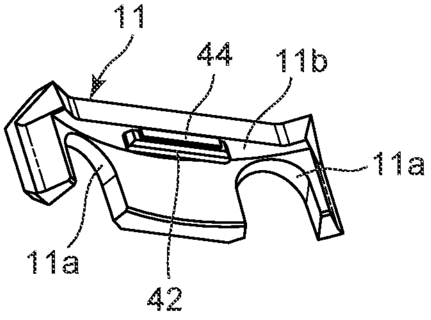
FIG. 23A is an enlarged perspective view showing the inner surface side of one of the side surface exterior members shown in FIG. 22.
Figure 23B:
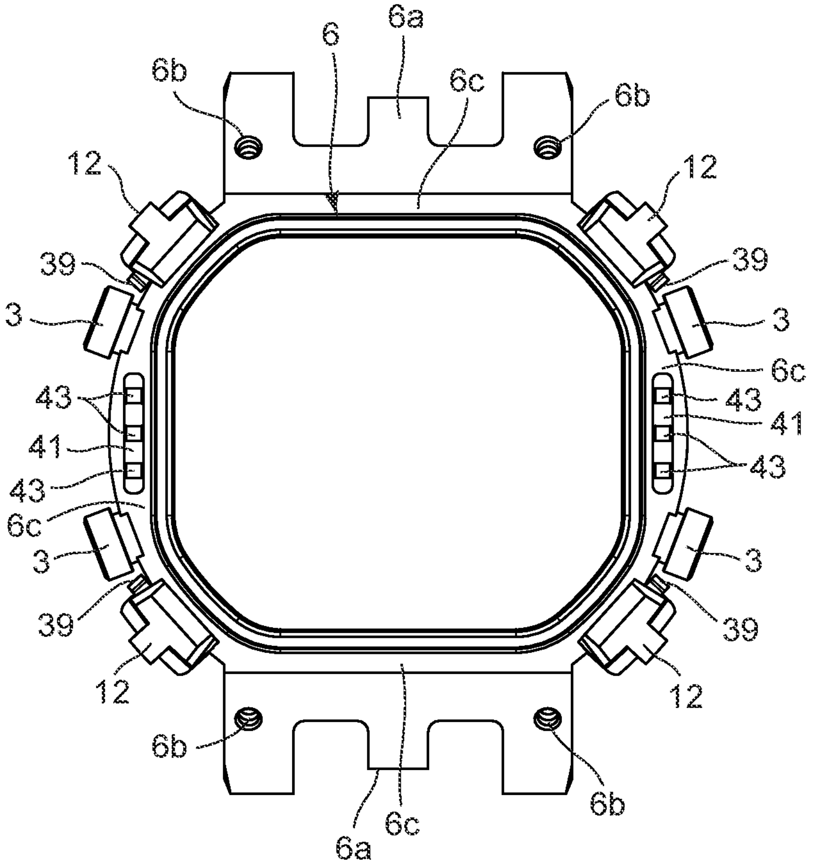
FIG. 23B is an enlarged planar view of the case main body of FIG. 22 when viewed from above.

The two side surface exterior members 11, which are provided on the side surface portions of the case main body 6 on the three o'clock side and the nine o'clock side, are structured to be arranged between the plurality of decorative members 12 provided on the side portions of the case main body 6 on the three o'clock side and between those provided on the side portions of the case main body 6 on the nine o'clock side, as shown in FIG. 22, FIG. 23A, and FIG. 23B. Each of these two side surface exterior members 11 is formed in a plate shape curved along the side surface, or in other words, the outer circumferential surface of the case main body 6.

The side surface exterior member 11 on the three o'clock side is structured to be arranged from above between the two decorative members 12 provided on the one o'clock side and five o'clock side of the case main body 6, resiliently held by the first spring sections 39 of the spring members 37 provided on the two decorative members 12, and thereby arranged on and attached to the side surface portion of the case main body 6 on the three o'clock side, as shown in FIG. 22, FIG. 23A and FIG. 23B.

As in the case of the side surface exterior member 11 on the three o'clock side, the side surface exterior member 11 on the nine o'clock side is structured to be arranged from above between the two decorative members 12 provided on the seven o'clock side and eleven o'clock side of the case main body 6, resiliently held by the first spring sections 39 of the spring members 37 provided on the two decorative members 12, and thereby arranged on and attached to the side surface portion of the case main body 6 on the nine o'clock side, as shown in FIG. 22, FIG. 23A and FIG. 23B.

Also, the side surface exterior member 11 on the three o'clock side is provided in a state where two switch cutout sections 11*a* into which the switch buttons 3 provided on the side surface portions of the case main body 6 on the two o'clock side and the four o'clock side are inserted are open at the lower end part of this side surface exterior member 11, as shown in FIG. 22, FIG. 23A and FIG. 23B. Similarly, the side surface exterior member 11 on the nine o'clock side is provided in a state where two switch cutout sections 11*a* into which the switch buttons 3 provided on the side surface portions of the case main body 6 on the eight o'clock side and the ten o'clock side are inserted are open at the lower end part of this side surface exterior member 11.

On the inner surfaces of the side surface exterior members 11, engaging projection sections 42 are provided which engage with engaging recess sections 41 formed in side portions of the case main body 6 on the three o'clock side and the nine o'clock side, as shown in FIG. 22, FIG. 23A and FIG. 23B. Here, on the outer circumferential portion of the case main body 6 located at the boundary between the portion where the watch glass 4 is attached and the portions to which the switch buttons 3 are attached, the first stepped surface 6*c* has been formed extending thereon. Correspondingly, on the inner surface of each side surface exterior member 11, a second stepped surface 11*b* is formed which is arranged on the first stepped surface 6*c* of the case main body 6.

The engaging recess sections 41 are formed in the first stepped surface 6*c* of the case main body 6 in a manner to be open upward, as shown in FIG. 22, FIG. 23A and FIG. 23B. Accordingly, the engaging projection sections 42 are provided on the second stepped surfaces 11*b* on the inner sides of the side surface exterior members 11 in a manner to project downward. As a result, the side surface exterior members 11 are structured such that, when the plurality of switch buttons 3 of the case main body 6 is inserted into the plurality of switch cutout sections 11*a* and the second stepped surfaces 11*b* are arranged on the first stepped surface 6*c* of the case main body 6, the engaging projection sections 42 of the side surface exterior members 11 are inserted into and engage with the engaging recess sections 41 of the case main body 6 from above, whereby the side surface exterior members 11 are attached to the case main body 6 without being slipped out from the case main body 6.

On the bottom of each engaging recess section 41, first buffer members 43 against which the undersurface of the corresponding engaging projection section 42 is pressed are provided, as shown in FIG. 23B. These first buffer members 43 are provided by one buffer member being divided into three buffer members and arranged on the bottom of each engaging recess section 41. However, a structure may be adopted in which one buffer member having a sheet shape is provided over the entire bottom of each engaging recess section 41. On the side surfaces of each engaging projection section 42, second buffer members 44 are provided which are pressed against the sides of the inner surface of the corresponding engaging recess section 41.

As a result, the side surface exterior members 11 are structured such that, when the engaging projection sections 42 engage with the engaging recess sections 41 of the case main body 6 and attached to the case main body 6, the undersurfaces of the engaging projection sections 42 are pressed against the first buffer members 43 provided on the bottoms of the engaging recess sections 41, whereby the vertical rattling of the engaging projection sections 42 with respect to the engaging recess sections 41 are prevented, and the engaging projection sections 42 are vertically buffered with respect to the engaging recess sections 41, as shown in FIG. 23A and FIG. 23B.

Also, the side surface exterior members 11 are structured such that, when the engaging projection sections 42 engage with the engaging recess sections 41 of the case main body 6 and attached to the case main body 6, the second buffer members 44 provided on the side surfaces of the engaging projection sections 42 are pressed against the sides of the inner surfaces of the engaging recess sections 41, whereby the rattling of the engaging projection sections 42 with respect to the engaging recess sections 41 in the three o'clock and nine o'clock directions are prevented, and the engaging projection sections 42 are buffered with respect to the engaging recess sections 41 in the three o'clock and nine o'clock directions, as shown in FIG. 23A and FIG. 23B.

Next, a procedure for assembling such a wristwatch case 1 will be described.

In this case, the surfaces of the upper surface exterior member 7, the band exterior members 10, the side surface exterior members 11 and the decorative members 12 are individually subjected to surface finishing treatment to have a finished surface such as a hairline pattern, a satin pattern, a mirror surface, and the like. Here, each decorative member 12 is disassembled to the fixing member 30 and the movable member 31, and then the surfaces of the first decorative sections 34 of the fixing member 30 and the surfaces of the second decorative section 35 and third decorative section 36 of the movable member 31 after the disassembly are subjected to surface finishing treatment.

Then, first, each decorative member 12 is assembled. In each assembly, the pair of holding sections 38*b* located to the sides of the spring cutout section 38*a* in the spring main body 38 of the spring member 37 is arranged on the step recess sections 34*b* in the upper ends of the pair of first decorative sections 34 of the fixing member 30. Here, the first spring section 39 provided on one end of the spring main body 38 is arranged along a side surface of one of the first decorative sections 34.

In this state, the second decorative section 35 of the movable member 31 is arranged between the pair of first decorative sections 34 of the fixing member 30, and the third decorative section 36 of the movable member 31 is positioned corresponding to and arranged on the pair of step recess sections 34*b* in the upper ends of the first decorative sections 34. Here, the pair of holding sections 38*b* of the spring member 37 is held between the step recess sections 34*b* of the pair of first decorative sections 34 and the undersurface of the third decorative section 36. In this state, the first attachment holes 34*a* of the pair of first decorative sections 34 and the second attachment hole 35*a* of the second decorative section 35 are coaxially positioned corresponding to one another, and the second decorative section 35 is attached to the pair of first decorative sections 34 by the attachment shaft 28.

In this attachment, the press fitting section 28*a* which has a larger outer diameter and located on one end of the attachment shaft 28 and the other end on the opposite side are inserted through the first attachment hole 34*a* of the first decorative section 34 on one side toward the second attachment hole 35*a* of the second decorative section 35, the other end of the inserted attachment shaft 28 is inserted into the first attachment hole 34*a* of the first decorative section 34 on the other side, and the press fitting section 28*a* having a larger outer diameter is press fitted into and fixed in the first attachment hole 34*a* of the first decorative section 34 on the one side. As a result, the attachment shaft 28 is attached to the pair of first decorative sections 34, and the second decorative section 35 is easily and unfailingly attached to the pair of first decorative sections 34 by this attachment shaft 28.

In this state, since the second attachment hole 35*a* of the second decorative section 35 is an elongated hole whose vertical length is slightly longer than that of the first attachment hole 34*a* of each first decorative section 34, the attachment shaft 28 relatively moves in the vertical directions in the second attachment hole 35*a* of the second decorative section 35. Accordingly, the second decorative section 35 and third decorative section 36 of the movable member 31 move in the vertical directions with the second decorative section 35 being arranged between the pair of first decorative sections 34 of the fixing member 30.

Here, since the second spring sections 40 of the spring member 37 are pressed against the undersurface of the third decorative section 36, the third decorative section 36 is pressed upward by the spring force of these pressed second spring sections 40, whereby the second decorative section 35 is arranged between the pair of first decorative sections 34 with it being pressed upward. By this procedure, the assembly of each decorative member 12 is completed.

Then, the watch glass 4 is fitted into and attached to the upper opening of the case main body 6, and the decorative members 12 are attached to the side surface portions of the case main body 6 on the one o'clock side, the five o'clock side, the seven o'clock side, and the eleven o'clock side, respectively. In this attachment, the fitting projection sections 33 of the fixing members 30 of the decorative members 12 are fitted into the fitting recess sections 32 formed in the side surface of the case main body 6. Here, the undersurfaces of the fitting projection sections 33 are brought into contact with the undersurfaces of the fitting recess sections 32, and a side surface of each fitting projection section 33 on the corresponding band attachment projection section 6*a* side of the case main body 6 is brought into contact with the corresponding side of the inner surface of the corresponding fitting recess section 32, whereby the fitting projection sections 33 are positionally fixed and fitted into the fitting recess sections 32.

Here, the inner surfaces of the fitting projection sections 33 on the case main body 6 side are adhered to and temporarily fixed on the inner surfaces of the fitting recess sections 32 with adhesive tape (not shown). In this state, an edge of one of the first decorative sections 34 of each decorative member 12 which is located further from the corresponding band attachment projection section 6*a* than the other one is fixed to the side surface of the case main body 6 by welding such as laser welding. As a result, the decorative members 12 are attached to the side surface of the case main body 6 with the fixing members 30 being reliably and firmly fixed to the case main body 6. In this state, the movable members 31 are pushed upward by the spring force of the second spring sections 40 of the spring members 37.

Also, in this state, each first spring section 39 of the plurality of spring members 37 attached to the plurality of decorative members 12 is on a side surface of one of the corresponding first decorative sections 34 located further from the corresponding band attachment projection section 6*a* than the other one. That is, among the first spring sections 39 of the plurality of decorative members 12, the first spring sections 39 arranged on the one o'clock side and five o'clock side of the case main body 6 are opposed to each other on the three o'clock side of the case main body 6. Similarly, the first spring sections 39 arranged on the seven o'clock side and eleven o'clock side of the case main body 6 are opposed to each other on the nine o'clock side of the case main body 6.

Then, the side surface exterior members 11 are arranged on the side surface portions of the case main body 6 on the three o'clock side and the nine o'clock side. Here, each side surface exterior member 11 is inserted between the corresponding decorative members 12 on the side surface of the case main body 6 from above the case main body 6. As a result, both sides of each side surface exterior member 11 are resiliently pressed and held by the spring force of the first spring sections 39 of the spring members 37 provided on the corresponding decorative members 12.

That is, both sides of the side surface exterior member 11 arranged on the three o'clock side of the case main body 6 are resiliently pressed and held by the spring force of the first spring sections 39 arranged opposing each other on the three o'clock side of the case main body 6. Similarly, both sides of the side surface exterior member 11 arranged on the nine o'clock side of the case main body 6 are resiliently pressed and held by the spring force of the first spring sections 39 arranged opposing each other on the nine o'clock side of the case main body 6. As a result of this structure, each side surface exterior member 11 is easily and favorably arranged between the corresponding decorative members 12.

When each side surface exterior member 11 is being arranged between the corresponding decorative members 12 from above the case main body 6, the plurality of switch buttons 3 provided on the side surface of the case main body 6 is inserted into the switch cutout sections 11*a* of the side surface exterior members 11, and the engaging projection sections 42 provided on the second stepped surfaces 11*b* of the side surface exterior members 11 are inserted from above into and engage with the engaging recess sections 41 provided in the first stepped surface 6*c* of the outer circumferential portion of the case main body 6.

Here, the undersurfaces of the engaging projection sections 42 are pressed against the first buffer members 43 provided on the bottoms of the engaging recess sections 41, and the second buffer members 44 provided on the side surfaces of the engaging projection sections 42 are pressed against the side surfaces of the engaging recess sections 41. As a result, by the first buffer members 43 and the second buffer members 44, the engaging projection sections 42 are attached to the engaging recess sections 41 in buffered states without rattling in the vertical directions and the three and nine o'clock directions.

Accordingly, the side surface exterior members 11 are favorably attached to the case main body 6 without rattling. Also, here, the second stepped surfaces 11*b* provided on the inner surfaces of the side surface exterior members 11 come in contact with and arranged on the first stepped surface 6*c* of the case main body 6. As a result, the side surface exterior members 11 are attached to the side surface of the case main body 6 without being slipped out.

Then, the upper surface exterior member 7 is positionally fixed on the upper part of the case main body 6 by the positioning members 8. In the present embodiment, before this positioning, the positioning members 8 are connected to the upper surface exterior member 7. More specifically, the upright sections 15 of the positioning members 8 are inserted from below into the connection recess sections 13 formed in the undersurface portions of the upper surface exterior member 7 on the 12 o'clock side and the six o'clock side so that the engaging hooks 14 on the connection recess sections 13 engage with the engaging recess sections 17 of the upright sections 15. As a result, the positioning members 8 are connected to the upper surface exterior member 7.

Here, by the engaging hooks 14 on the connection recess sections 13 engaging with the engaging recess sections 17 of the upright sections 15, the vertical position of the upper surface exterior member 7 with respect to the positioning members 8 is restricted. In addition, the first dowels 18 provided on the side surfaces of each upright section 15 in the three o'clock and nine o'clock directions come in contact with the sides of the inner surface of the corresponding connection recess section 13, whereby the position of the upper surface exterior member 7 in the three o'clock and nine o'clock direction with respect to the positioning members 8 is restricted. In this state, the upper surface exterior member 7 is arranged on the upper part of case main body 6, and the flat plate sections 16 of the positioning members 8 are arranged on the band attachment projection sections 6*a* of the case main body 6.

Here, the second dowels 20 provided on the inner surfaces of the upright sections 15 in the twelve o'clock and six o'clock directions which oppose the outer circumferential surface of case main body 6 come in contact with the outer circumferential surface of the case main body 6, whereby the positions of the positioning members 8 in the twelve o'clock and six o'clock directions with respect to the case main body 6 are restricted. As a result, the position of the upper surface exterior member 7 with respect to the case main body 6 in the three-dimensional directions including the vertical directions, the three o'clock and nine o'clock directions, and the twelve o'clock and six o'clock directions is restricted by the positioning members 8, and the upper surface exterior member 7 is positionally fixed with respect to the case main body 6.

Then, the band exterior members 10 are arranged on the band attachment projection sections 6*a* of the case main body 6. Here, the cover main bodies 21 of the band exterior members 10 are arranged on the band attachment projection sections 6*a* where the flat plate sections 16 of the positioning members 8 have been arranged, and the pair of cover sidewall sections 22 of each band exterior member 10 is arranged to the sides of the corresponding band attachment projection section 6*a*. In addition, the upright sections 15 of the positioning members 8 are arranged in the cutout sections 23 of the cover main bodies 21.

As a result, each pair of cover sidewall sections 22 comes in contact with the sides of the corresponding band attachment projection section 6*a*, whereby the positions of the band exterior members 10 in the three o'clock and nine o'clock directions are restricted. In addition, the third dowels 24 of each upright section 15 come in contact with the sides of the inner surface of the cutout section 23 in the corresponding cover main body 21 in the three o'clock and nine o'clock directions, whereby the positions of the upright sections 15 with respect to the band attachment projection sections 6*a* in the three o'clock and nine o'clock directions are restricted. Simultaneously, the fourth dowels 25 of the upright sections 15 come in contact with the inner surface portions of the cutout sections 23 of the cover main bodies 21 in the twelve o'clock and six o'clock directions, whereby the positions of the upright sections 15 with respect to the band attachment projection sections 6*a* in the twelve o'clock and six o'clock directions are restricted.

As a result, the positions of the band exterior members 10 with respect to the band attachment projection sections 6*a* in the three-dimensional directions including the vertical directions, the three o'clock and nine o'clock directions, and the twelve o'clock and six o'clock directions are restricted, whereby the band exterior members 10 are positionally fixed on the band attachment projection sections 6*a*. Accordingly, the positions of the positioning members 8 with respect to the case main body 6 in the three o'clock and nine o'clock directions and the twelve o'clock and six o'clock directions are restricted, whereby the positioning members 8 are positionally fixed on the case main body 6. In this state, the positioning members 8 have been completely covered by the band exterior members 10 and therefore cannot be seen from the outside.

Then, the band exterior members 10 are attached to the band attachment projection sections 6*a* by the screw members 26. Here, since the band exterior members 10 have been positionally fixed on the band attachment projection sections 6*a*, the counterbored holes 27 of the band exterior members 10, the screw insertion sections 16*a* of the positioning members 8, the screw holes 6*b* of the band attachment projection sections 6*a* coaxially correspond to one another. In this state, the thread sections 26*b* are inserted into the counterbored holes 27 of the band exterior members 10 from above the band exterior members 10 and then inserted into the screw insertion sections 16*a* of the flat plate sections 16 of the positioning members 8 so as to reach the screw holes 6*b* of the band attachment projection sections 6*a*.

In this state, the leading end of a screwdriver (not shown in the drawings) is inserted into each screw hole 6*b* of the band attachment projection sections 6*a* from the back surface sides of the band attachment projection sections 6*a* so as to be inserted into each screwdriver groove 26*c* formed in the leading ends of the thread sections 26*b*. Subsequently, when each thread section 26*b* is rotated with the screwdriver, this thread section 26*b* is screwed into the screw hole 6*b* of the corresponding band attachment projection section 6*a* and fastened.

Here, the decorative head sections 26*a* are arranged in the large-diameter hole portions of the counterbored holes 27 of the band exterior members 10, and press the cover main bodies 21 of the band exterior members 10 against the flat plate sections 16 of the positioning members 8. By the cover main bodies 21 pressing the flat plate sections 16 against the band attachment projection sections 6*a*, the band exterior members 10 are attached to the band attachment projection sections 6*a*, and the flat plate sections 16 of the positioning members 8 are pressed against and fixed on the band attachment projection sections 6*a* by the band exterior members 10. In this state, the decorative head sections 26*a* of the screw members 26 have been exposed to the outside from the counterbored holes 27, which enhances the decorativeness and the design.

In addition, since the positioning members 8 have been positionally fixed on the band attachment projection sections 6*a* by the band exterior members 10, the upper surface exterior member 7 is positionally fixed on the upper part of the case main body 6 by these fixed positioning members 8. In this state, the upper surface exterior member 7 positionally fixed on the upper part of the case main body 6 holds down the plurality of side surface exterior members 11 and the plurality of decorative members 12 arranged on the side surface of the case main body 6.

As a result, the plurality of side surface exterior members 11 is attached to the side surface of the case main body 6 without being slipped upward. In addition, since the undersurfaces of the engaging projection sections 42 of the side surface exterior members 11 are pressed against the first buffer members 43 provided on the bottoms of the engaging recess sections 41 of the case main body 6 and the second buffer members 44 provided on the side surfaces of the engaging projection sections 42 are pressed against the sides of the inner surfaces of the engaging recess sections 41, the plurality of side surface exterior members 11 is reliably and favorably attached to the case main body 6 without rattling.

In addition, when the plurality of decorative members 12 are held down by the upper surface exterior member 7, since the third decorative sections 36 of the movable members 31 of the decorative members 12 are resiliently held down against the spring force of the second spring sections 40 of the spring members 37, the movable members 31 of the decorative members 12 are unfailingly and favorably attached to the case main body 6 without rattling. By the above-described procedure, the assembly of the wristwatch case 1 is completed.

As such, even though this wristwatch case 1 is constituted by a plurality of divided parts including the upper surface exterior member 7, the positioning members 8, the band exterior members 10, the plurality of side surface exterior members 11, and the plurality of decorative members 12, when the band exterior members 10 are attached to the band attachment projection sections 6*a* by the screw members 26, the positioning members 8 are fixed to the case main body 6 by the band exterior members 10, the upper surface exterior member 7 is fixed to the case main body 6 by the positioning members 8, and the plurality of side surface exterior members 11 and the plurality of decorative members 12 are held down to the case main body 6 by the upper surface exterior member 7, whereby the assembly can be easily and favorably performed.

Next, the mechanism of this wristwatch is described.

In the wristwatch case 1, when the upper surface exterior member 7 receives an impact from above, this impact is dispersed and buffered by the positioning members 8 so that the exertion of the impact onto the case main body 6 is reduced, whereby the timepiece module (not shown) in the case main body 6 is not affected and damaged by the impact. By this structure, impact resistance is acquired.

In addition, when attached to the upper part of the case main body 6, the upper surface exterior member 7 holds down the plurality of side surface exterior members 11 and the plurality of decorative members 12 provided on the side surface of the case main body. Accordingly, when the upper surface exterior member 7 receives an impact from above, this impact is buffered by the plurality of side surface exterior members 11 and the plurality of decorative members 12 so that the exertion of the impact onto the case main body 6 is reduced, whereby the timepiece module (not shown) in the case main body 6 is not affected and damaged by the impact. By this structure as well, impact resistance is acquired.

That is, since each side surface exterior member 11 is resiliently held between the plurality of corresponding decorative members 12 on the side surface of the case main body 6 by the spring force of the first spring sections 39 of the corresponding spring members 37, when the upper surface exterior member 7 receives an impact from above, this impact is buffered by the spring force of the first spring sections 39 of the spring members 37 resiliently holding the side surface exterior member 11 therebetween so that the exertion of the impact onto the case main body 6 is reduced, whereby the timepiece module (not shown) in the case main body 6 is not affected and damaged by the impact. By this structure as well, impact resistance is acquired.

Also, when the side surface exterior members 11 are attached to the case main body 6 by the engaging projection sections 42 engaging with the engaging recess sections 41 of the case main body 6, the undersurfaces of the engaging projection sections 42 are pressed against the first buffer members 43 on the bottom surfaces of the engaging recess sections 41, and the second buffer members 44 provided on the side surfaces of each engaging projection section 42 are pressed against the sides of the inner surface of the corresponding engaging recess section 41. Accordingly, an impact exerted from above onto the upper surface exterior member 7 is buffered by the first buffer members 43 and the second buffer members 44 so that the exertion of the impact onto the case main body 6 is reduced, whereby the timepiece module (not shown) in the case main body 6 is not affected and damaged by the impact. By this structure as well, impact resistance is acquired.

Also, in each decorative member 12, the movable member 31 is attached to the fixing member 30 fixed to the side surface of the case main body 6 in a manner to be vertically movable by the attachment shaft 28, and forced upward by the second spring sections 40 of the spring member 37. Accordingly, when the upper surface exterior member 7 receives an impact from above, this impact is buffered by the spring force of the second spring sections 40 of the spring member 37 which is resiliently forcing the third decorative section 36 of the movable member 31 upward, so that the exertion of the impact onto the case main body 6 is reduced, and the timepiece module (not shown) in the case main body 6 is not affected and damaged by the impact. By this structure as well, impact resistance is acquired Also, in this wristwatch case 1, the upper surface exterior member 7 is arranged on the upper part of the case main body 6, the band exterior members 10 are arranged on the band attachment projection sections 6*a* of the case main body 6, and the plurality of side surface exterior members 11 and the plurality of decorative members 12 are arranged on the side surface of the case main body 6. As a result of this structure, the decorativeness and design of the wristwatch case 1 are enhanced.

That is, in the case of this wristwatch case 1, the upper surface exterior member 7 is made of a highly decorative metal such as a cobalt chrome alloy, and the band exterior members 10, the side surface exterior members 11, and the decorative members 12 are made of a highly decorative metal such as a titanium alloy, which enhance the decorativeness, the design, and the commodity value.

In addition, even though this wristwatch case 1 has a complicated outer shape by the presence of the upper surface exterior member 7, the band exterior members 10, the side surface exterior members 11, and the decorative members 12, the decorativeness, the design, and the commodity value are further enhanced because the surface finishing treatment has been performed on the surfaces of the upper surface exterior member 7, the band exterior members 10, the side surface exterior members 11 and the decorative members 12.

That is, in the case of this wristwatch case 1, the upper surface exterior member 7, the band exterior members 10, the side surface exterior members 11, and the decorative members 12 can be detached from the case main body 6 so as to be individually subjected to surface finishing treatment. As a result of this structure, even though the upper surface exterior member 7, the band exterior members 10, the side surface exterior members 11, and the decorative members 12 are made of a metal having high hardness and decorativeness such as a cobalt-chromium alloy or a titanium alloy, surface finishing treatment such as hairline finishing, satin finishing, mirror finishing and the like can be favorably performed.

As described above, this wristwatch case 1 includes the case main body 6, the upper surface exterior member 7 which is the first exterior member and arranged on the upper part of the case main body 6, and the positioning members 8 which are connected to the upper surface exterior member 7 and positionally fix the upper surface exterior member 7 on the case main body 6. As a result of this structure, impacts can be buffered, and the decorativeness and the design can be enhanced.

That is, in this wristwatch case 1, the upper surface exterior member 7 is positionally fixed on the upper part of the case main body 6 by the positioning members 8. Accordingly, when the upper surface exterior member 7 receives an impact from above, this impact is dispersed and buffered by the positioning members 8 so that the exertion of the impact onto the case main body 6 is reduced, whereby the timepiece module (not shown) in the case main body 6 is not affected and damaged by the impact. By this structure, impact resistance is acquired.

Also, in the case of this wristwatch case 1, the upper surface exterior member 7 is not required to be directly attached to the upper part of the case main body 6 with screws, and can be attached to the upper part of the case main body 6 by being positionally fixed by the positioning members 8. Therefore, its outer appearance and design is favorable. In addition, the positioning members 8 are covered by the band exterior members 10 serving as the second exterior members and cannot be seen from the outside, which enhances the decorativeness and the design. Moreover, the upper surface exterior member 7 is made of a decorative metal such as a cobalt chrome alloy, which further enhances the decorativeness and the design.

Moreover, in this wristwatch case 1, the connection recess sections 13 are formed in the undersurface of the upper surface exterior member 7 in a manner to be open downward, and each positioning member 8 includes the upright section serving as the first positioning section which is arranged in the corresponding connection recess section 13, positionally fixed in the upper surface exterior member 7, and positionally fixed on the outer circumferential surface of the case main body 6, and the flat plate section 16 serving as the second positioning section which is arranged and positionally fixed on the corresponding band attachment projection section **6*a* provided on the case main body 6. As a result of this structure, the positioning members 8 are reliably and favorably connected to the upper surface exterior member 7 by the upright sections 15, and the position of the upper surface exterior member 7 is precisely and favorably fixed on the upper part of the case main body 6**.

Furthermore, in this wristwatch case 1, each upright section 15 includes the engaging recess section 17 which engages with the engaging hook 14 provided on the corresponding connection recess section 13 and restricts the position of the upper surface exterior member 7 in the vertical directions which are the front and back directions, the first dowels 18 serving as the first restriction projection sections which come in contact with the sides of the inner surface of the connection recess section 13 in the three o'clock and nine o'clock directions so as to restrict the position of the upper surface exterior member 7 in the three o'clock and nine o'clock directions, and the second dowels 20 serving as the second restriction projection sections which are positioned in the connection recess section 13 and come in contact with the outer circumferential surface of the case main body 6 so as to restrict the position of the upper surface exterior member 7 in the twelve o'clock or six o'clock direction. As a result of this structure, the position of the upper surface exterior member 7 is precisely and favorably fixed on the upper part of the case main body 6.

That is, in this wristwatch case 1, the engaging hooks 14 provided on the connection recess sections 13 engage with the engaging recess sections 17 of the upright sections 15 so as to restrict the vertical position of the upper surface exterior member 7 with respect to the positioning members 8, and the first dowels 18 of each upright section 15 come in contact with the sides of the inner surface of the corresponding connection recess section 13 in the three o'clock and nine o'clock directions so as to restrict the position of the upper surface exterior member 7 with respect to the positioning member 8 in the three o'clock and nine o'clock directions.

In addition, in this wristwatch case 1, the second dowels 20 of the upright sections 15 in the connection recess sections 13 come in contact with the outer circumferential surface of the case main body 6 so as to unfailingly restrict the position of the upper surface exterior member 7 in the twelve o'clock and six o'clock directions. As a result of this structure, the position of the upper surface exterior member 7 with respect to the case main body 6 in the three-dimensional directions including the vertical directions, the three o'clock and nine o'clock directions, and the twelve o'clock and six o'clock directions is restricted by the positioning members 8, and the upper surface exterior member 7 is positionally fixed on the upper part of the case main body 6 precisely and favorably.

Also, this wristwatch case 1 includes the band exterior members 10 serving as the second exterior members which are provided on the band attachment projection sections **6*a* on the case main body 6, and cover and positionally fix the positioning members 8. As such, by these band exterior members 10, the positions of the positioning members 8 with respect to the case main body 6 can be fixed, and the position of the upper surface exterior member 7 can be precisely and favorably fixed on the upper part of the case main body 6 by these positioning members 8. In addition, the positioning members 8 which have positionally fixed the upper surface exterior members 7 on the upper part of the case main body 6 can be covered by the band exterior members 10** so that they cannot be seen from the outside. By this structure as well, the decorativeness and the design can be enhanced.

Moreover, in this wristwatch case 1, each band exterior member 10 includes the cutout section 23 serving as the first restriction recess in which the upright section 15 of the corresponding positioning member 8 is arranged, and the cover sidewall sections 22 serving as the second restriction recess which come in contact with the sides of the corresponding band attachment projection section **6*a* of the case main body 6 and restrict the position of the band exterior member 10 with respect to the case main body 6 in the three o'clock and nine o'clock directions. As a result of this structure, the positions of the positioning members 8 with respect to the case main body 6** can be unfailingly and favorably fixed.

That is, in this wristwatch case 1, the upright sections 15 of the positioning members 8 are arranged in the cutout sections 23 of the band exterior members 10, whereby the positions of the upright sections 15 with respect to the case main body 6 in the three o'clock and nine o'clock directions and the twelve o'clock and six o'clock directions can be fixed and the upright sections 15 can be unfailingly and favorably covered by the band exterior members 10. In addition, the positions of the band exterior members 10 with respect to the band attachment projection sections **6*a* in the three o'clock and nine o'clock directions can be fixed by the cover sidewall sections 22, whereby the positions of the positioning members 8 with respect to the case main body 6** in the three o'clock and nine o'clock directions can be fixed.

Also, in this wristwatch case 1, each upright section 15 includes the third dowels 24 serving as the third restriction projections which come in contact with the sides of the inner surface of the cutout section 23 in the corresponding band exterior member 10 so as to restrict the position of the positioning member 8 in the three o'clock and nine o'clock directions, and the fourth dowels 25 serving as the fourth restriction projections which come in contact with the inner surface portions of the corresponding cutout section 23 on the twelve o'clock side or the six o'clock side so as to restrict the position of the positioning member 8 in the twelve o'clock or six o'clock direction. As a result of this structure, the positions of the positioning members 8 can be precisely and unfailingly fixed with respect to the case main body 6.

That is, in this wristwatch case 1, the third dowels 24 of each upright section 15 come in contact with the sides of the inner surface of the cutout section 23 in the corresponding cover main body 21 in the three o'clock and nine o'clock directions so as to restrict the position of the upright section 15 with respect to the corresponding band attachment projection section 6*a* in the three o'clock and nine o'clock directions, and the fourth dowels 25 of the upright section 15 come in contact with the inner surface portions of the cutout section 23 in the cover main body 21 on the twelve o'clock side or the six o'clock side so as to restrict the position of the upright section 15 with respect to the band attachment projection section 6*a* in the twelve o'clock or six o'clock direction.

As a result, in this wristwatch case 1, the positions of the band exterior members 10 on the band attachment projection sections 6*a* in the three-dimensional directions including the vertical directions, the three o'clock and nine o'clock directions, and the twelve o'clock and six o'clock directions are restricted, whereby the band exterior members 10 are positionally fixed on the band attachment projection sections 6*a*. Accordingly, the positions of the positioning members 8 with respect to the case main body 6 in the three o'clock and nine o'clock directions and the twelve o'clock and six o'clock directions are restricted, whereby the positioning members 8 are positionally fixed on the case main body 6 precisely and unfailingly.

Also, this wristwatch case 1 includes the screw members 26 which fix the band exterior members 10 to the band attachment projection sections 6*a* with the flat plate sections 16 of the positioning members 8 being held between the band attachment projection sections 6*a* of the case main body 6 and the band exterior members 10. As a result of this structure, by these screw members 26, the band exterior members 10 can be reliably fixed to the band attachment projection sections 6*a* with the flat plate sections 16 of the positioning members 8 being held between the band exterior members 10 and the band attachment projection sections 6*a*.

Accordingly, in this wristwatch case 1, the positioning members 8 are fixed to the band attachment projection sections 6*a* by the band exterior members 10, whereby the upper surface exterior member 7 can be positionally fixed on the upper part of the case main body 6 reliably and favorably by the fixed positioning members 8.

Moreover, in this wristwatch case 1, each screw member 26 includes the decorative head section 26*a* which is arranged in the corresponding band exterior member 10, the thread section 26*b* which is screwed into the corresponding band attachment projection section 6*a* through the screw insertion section 16*a* formed in the corresponding flat plate section 16, and the screwdriver groove 26*c* formed in the leading end of the thread section 26*b*. As a result of this structure, the band exterior members 10 are attached to the band attachment projection sections 6*a* by the screw members 26, and the decorative head sections 26*a* arranged in the band exterior members 10 are exposed upward from the band exterior members 10, which enhance the decorativeness and the design.

That is, in this wristwatch case 1, the thread sections 26*b* are inserted into the counterbored holes 27 of the band exterior members 10 from above the band exterior members 10 and then inserted into the screw insertion sections 16*a* of the flat plate sections 16 of the positioning members 8 so as to reach the screw holes 6*b* of the band attachment projection sections 6*a*. In this state, the leading end of a screwdriver (not shown in the drawings) is inserted into each screw hole 6*b* of the band attachment projection sections 6*a* from the back surface sides of the band attachment projection sections 6*a* so as to be inserted into each screwdriver groove 26*c*. Then, each thread section 26*b* is rotated, screwed into the screw hole 6*b* of the corresponding band attachment projection section 6*a*, and fastened.

As such, in this wristwatch case 1, each thread section 26*b* can be rotated by a screwdriver, screwed into the screw hole 6*b* of the corresponding band attachment projection section 6*a*, and fastened, from the back surface sides of the band attachment projection sections 6*a*. As a result of this structure, the band exterior members 10 can be attached to the band attachment projection sections 6*a* in the state where the decorative head sections 26*a* have been arranged in the large-diameter hole portions of the counterbored holes 27 in the band exterior members 10 and exposed on the upper surface sides of the band exterior members 10, and the flat plate sections 16 of the positioning members 8 have been held down. In addition, the exposed decorative head sections 26*a* enhance the decorativeness and the design.

Also, in this wristwatch case 1, the upper surface exterior member 7 holds down the plurality of side surface exterior members 11 and the plurality of decorative members 12 on the side surface of the case main body 6 from above. As a result of this structure, by the upper surface exterior member 7 positionally fixed on and attached to the upper part of the case main body 6, the plurality of side surface exterior members 11 and the plurality of decorative members 12 can be reliably and favorably held down and attached to the side surface of the case main body 6 without rattling.

In the above-described embodiment, the upper surface exterior member 7, the band exterior members 10, the side surface exterior members 11, and the decorative members 12 are made of a metallic material or a fragile material. However, the present invention is not limited thereto, and they may be formed using synthetic resin. Also, the upper surface exterior member 7, the band exterior members 10, the side surface exterior members 11, and the decorative members 12 may be formed using a different material for each member.

Also, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. Furthermore, the present invention is not necessarily required to be applied in timepieces, and can be applied in electronic devices such as an arm wearable device, a portable telephone, and a portable terminal device.

While the present invention has been described with reference to the preferred embodiments, it is intended that the invention be not limited by any of the details of the description therein but includes all the embodiments which fall within the scope of the appended claims.

What is claimed is:

1. A case comprising:

a case main body;

a band attachment projection provided to project from one of a twelve o'clock side and a six o'clock side of the case main body, and configured to be attached to a watch band;

a first exterior member arranged on an upper part of the case main body; and a positioning member connected to the first exterior member, wherein the first exterior member comprises a connection portion provided in an undersurface thereof, and wherein the positioning member comprises:

a first positioning portion portions which are arranged in the connection portion to be positionally fixed to the first exterior member, and positionally fixed on the case main body; and a second positioning portion extending from the first positioning portion from the one of the twelve o'clock side and the six o'clock side of the case main body, wherein an undersurface of the second positioning portion is arranged on the band attachment portion to positionally fix the first exterior member on the case main body.

2. The case according to claim 1, wherein the connection portion in the undersurface of the first exterior member is a connection recess, wherein the first positioning portion is positionally fixed on portions of an outer circumferential surface of the case main body on a twelve o'clock side and a six o'clock side, and wherein the second positioning portion is arranged on the attachment projection provided on the case main body.

3. The case according to claim 2, wherein the first positioning portion includes (i) an engaging recess which engages with an engaging hook provided on the connection recess so as to restrict a position of the first exterior member in front and back directions, (ii) first restriction projections which come in contact with sides of inner surfaces of the connection recess in three o'clock and nine o'clock directions so as to restrict a position of the first exterior member in the three o'clock and nine o'clock directions, and (iii) second restriction projections which come in contact with the outer circumferential surface of the case main body so as to restrict a position of the first exterior member in twelve o'clock and six o'clock directions.

4. The case according to claim 1, further comprising:

a second exterior member which is arranged on the attachment projection provided on the case main body, and covers and positionally fixes the positioning member.

5. The case according to claim 4, further comprising:

screw members which fix the second exterior member to the attachment projection with the second positioning portion of the positioning member being held between the attachment projection on the case main body and the second exterior member.

6. The case according to claim 5, wherein the screw members have decorative head portions which are arranged in the second exterior member, thread portions which are screwed into the attachment projection through screw insertion portions formed in the second positioning portion, and screwdriver grooves formed in leading ends of the thread portions.

7. A timepiece comprising the case according to claim 1.

8. A case comprising:

a case main body;

a first exterior member which is arranged on an upper part of the case main body; and positioning members which are connected to the first exterior member, and positionally fix the first exterior member on the case main body, wherein the first exterior member has connection portions provided in an undersurface thereof, wherein the positioning members have (i) first positioning portions which are arranged in the connection portions, positionally fixed in the first exterior member, and positionally fixed on the case main body, and (ii) second positioning portions which are arranged and positionally fixed on the case main body, and wherein the first positioning portions include (i) engaging recesses which engage with engaging hooks provided on the connection portions so as to restrict a position of the first exterior member in front and back directions, (ii) first restriction projections which come in contact with sides of inner surfaces of the connection portions in three o'clock and nine o'clock directions so as to restrict a position of the first exterior member in the three o'clock and nine o'clock directions, and (iii) second restriction projections which come in contact with the outer circumferential surface of the case main body so as to restrict a position of the first exterior member in twelve o'clock and six o'clock directions.

9. The case according to claim 8, wherein the connection portions in the undersurface of the first exterior member are connection recesses, wherein the first positioning portions are positionally fixed on portions of an outer circumferential surface of the case main body on a twelve o'clock side and a six o'clock side, and wherein the second positioning portions are arranged on attachment projections provided on the case main body.

10. The case according to claim 8, further comprising:

second exterior members which are arranged on attachment projections provided on the case main body, and cover and positionally fix the positioning members.

11. The case according to claim 8, wherein the first exterior member holds down a first side surface member, a second side surface member, and a third side surface member on a side surface of the case main body from above.

12. The case according to claim 10, wherein the second exterior members include first restriction recesses in which the first positioning portions are arranged, and second restriction recesses which come in contact with sides of the attachment projections on the case main body so as to restrict positions of the second exterior members with respect to the case main body in three o'clock and nine o'clock directions.

13. The case according to claim 12, wherein the first positioning portions include third restriction projections which come in contact with sides of inner surfaces of the first restriction recesses of the second exterior members in the three o'clock and nine o'clock directions so as to restrict positions of the positioning members in the three o'clock and nine o'clock directions, and fourth restriction projections which come in contact with the inner surfaces of the first restriction recesses on a twelve o'clock side and a six o'clock side so as to restrict positions of the positioning members in the twelve o'clock and six o'clock directions.

14. The case according to claim 10, further comprising:

screw members which fix the second exterior members to the attachment projections with the second positioning portions of the positioning members being held between the attachment projections on the case main body and the second exterior members.

15. The case according to claim 14, wherein the screw members have decorative head portions which are arranged in the second exterior members, thread portions which are screwed into the attachment projections through screw insertion portions formed in the second positioning portions, and screwdriver grooves formed in leading ends of the thread portions.

16. A timepiece comprising the case according to claim 8.

17. A case comprising:
- a case main body;
- a first exterior member which is arranged on an upper part of the case main body;
- positioning members which are connected to the first exterior member, and positionally fix the first exterior member on the case main body; and
- second exterior members which are arranged on attachment projections provided on the case main body, and cover and positionally fix the positioning members,
- wherein the first exterior member has connection portions provided in an undersurface thereof, and
- wherein the positioning members have (i) first positioning portions which are arranged in the connection portions, positionally fixed in the first exterior member, and positionally fixed on the case main body, and (ii) second positioning portions which are arranged and positionally fixed on the case main body.

18. The case according to claim 17,
- wherein the connection portions in the undersurface of the first exterior member are connection recesses,
- wherein the first positioning portions are positionally fixed on portions of an outer circumferential surface of the case main body on a twelve o'clock side and a six o'clock side, and
- wherein the second positioning portions are arranged on attachment projections provided on the case main body.

19. The case according to claim 18, wherein the first positioning portions include (i) engaging recesses which engage with engaging hooks provided on the connection recesses so as to restrict a position of the first exterior member in front and back directions, (ii) first restriction projections which come in contact with sides of inner surfaces of the connection recesses in three o'clock and nine o'clock directions so as to restrict a position of the first exterior member in the three o'clock and nine o'clock directions, and (iii) second restriction projections which come in contact with the outer circumferential surface of the case main body so as to restrict a position of the first exterior member in twelve o'clock and six o'clock directions.

20. The case according to claim 17, further comprising:
- second exterior members which are arranged on attachment projections provided on the case main body, and cover and positionally fix the positioning members.

21. The case according to claim 20, wherein the second exterior members include first restriction recesses in which the first positioning portions are arranged, and second restriction recesses which come in contact with sides of the attachment projections on the case main body so as to restrict positions of the second exterior members with respect to the case main body in three o'clock and nine o'clock directions.

22. The case according to claim 21, wherein the first positioning portions include third restriction projections which come in contact with sides of inner surfaces of the first restriction recesses of the second exterior members in the three o'clock and nine o'clock directions so as to restrict positions of the positioning members in the three o'clock and nine o'clock directions, and fourth restriction projections which come in contact with the inner surfaces of the first restriction recesses on a twelve o'clock side and a six o'clock side so as to restrict positions of the positioning members in the twelve o'clock and six o'clock directions.

23. The case according to claim 20, further comprising:
- screw members which fix the second exterior members to the attachment projections with the second positioning portions of the positioning members being held between the attachment projections on the case main body and the second exterior members.

24. A timepiece comprising the case according to claim 17.

* * * * *